United States Patent
Baek

(10) Patent No.: US 12,449,067 B2
(45) Date of Patent: Oct. 21, 2025

(54) WIRE COUPLING STRUCTURE AND METHOD OF INSTALLING THE SAME

(71) Applicant: HL Mando Corporation, Pyeongtaek-si (KR)

(72) Inventor: Sungoh Baek, Suwon-si (KR)

(73) Assignee: HL MANDO CORPORATION, Pyeongtaek-si Gyeonggi-Do (KR)

( * ) Notice: Subject to any disclaimer, the term of this patent is extended or adjusted under 35 U.S.C. 154(b) by 0 days.

(21) Appl. No.: 18/368,141

(22) Filed: Sep. 14, 2023

(65) Prior Publication Data
US 2024/0151326 A1   May 9, 2024

(30) Foreign Application Priority Data
Nov. 4, 2022   (KR) .................. 10-2022-0145918

(51) Int. Cl.
| | |
|---|---|
| *F16L 3/10* | (2006.01) |
| *F16L 3/12* | (2006.01) |
| *F16L 3/13* | (2006.01) |
| *H02G 3/30* | (2006.01) |
| *B60R 16/02* | (2006.01) |

(52) U.S. Cl.
CPC ............ *F16L 3/13* (2013.01); *H02G 3/30* (2013.01); *B60R 16/0222* (2013.01)

(58) Field of Classification Search
CPC ....... F16L 3/13; F16L 3/10; F16L 3/12; F16L 3/123; F16L 3/127; H02G 3/30; B60R 16/0222
USPC ...................................................... 248/74.2
See application file for complete search history.

(56) References Cited

U.S. PATENT DOCUMENTS

| | | | | |
|---|---|---|---|---|
| 5,785,285 | A * | 7/1998 | Gordon ..................... | F16L 3/22 74/498 |
| 6,343,772 | B1 * | 2/2002 | Oi ........................... | F16L 33/03 248/65 |
| 6,701,581 | B2 * | 3/2004 | Senovich ................ | F16L 33/03 285/252 |
| 10,807,543 | B2 * | 10/2020 | Toyoshima .......... | H01B 7/0045 |
| 10,876,656 | B2 * | 12/2020 | Nagai ................... | F16L 3/13 |
| 2008/0007043 | A1 * | 1/2008 | Martus ................... | F16L 33/03 285/23 |
| 2014/0299722 | A1 * | 10/2014 | Sampson ................ | F16L 3/237 248/74.2 |
| 2018/0254122 | A1 * | 9/2018 | Hagi ....................... | H02G 3/30 |

(Continued)

FOREIGN PATENT DOCUMENTS

| | | |
|---|---|---|
| KR | 20-0416265 Y1 | 5/2006 |
| KR | 10-2021-0084963 A | 7/2021 |

*Primary Examiner* — Nkeisha Smith
(74) *Attorney, Agent, or Firm* — Hauptman Ham, LLP

(57) ABSTRACT

A wire coupling structure and a method for installing the same are disclosed. A wire coupling structure according to an aspect of the present disclosure may include a fixer coupled to an external wire; a grommet surrounding the fixer and coupled to the wire and the fixer; and a bracket surrounding the grommet and coupled to the grommet, wherein the fixer includes a fixing body surrounding the wire from the radial outside; and a fixing protrusion continuous with the fixing body and protruding outward and exposed outward of the grommet, and wherein the bracket includes an arm body surrounding the grommet from the radial outside; and a fixing groove formed through the inside of the arm body and coupled to the fixing protrusion.

19 Claims, 20 Drawing Sheets

(56) References Cited

U.S. PATENT DOCUMENTS

| | | | |
|---|---|---|---|
| 2018/0259396 A1* | 9/2018 | Rogers | F16L 3/237 |
| 2022/0234527 A1* | 7/2022 | Shiratori | H02G 3/30 |

* cited by examiner (a)

(b)

WIRE COUPLING STRUCTURE AND METHOD OF INSTALLING THE SAME

CROSS-REFERENCE TO RELATED APPLICATION

This application claims priority to and the benefit of Korean Patent Application No. 10-2022-0145918, filed on Nov. 4, 2022, the disclosure of which is incorporated herein by reference in its entirety.

TECHNICAL FIELD

The present disclosure relates to a wire coupling structure and a method for installing the same, and more particularly, to a wire coupling structure having a structure capable of preventing distortion of one or more wires when a plurality of wires are coupled, and a method for installing the same.

BACKGROUND

Recently, the importance of eco-friendly and energy efficiency has increased, and electric vehicles (EVs) operated by electric power have been spotlighted. Most components of electric vehicles are configured to be operated by electric power supplied from batteries. Therefore, compared to an internal combustion engine vehicle, a wiring structure for electrically connecting each component to each other is more demanded for electric vehicles.

In order to densely have various wiring structures in a small space, each component provided in an electric vehicle is not only connected by a wiring but also a connection between wirings is required. However, in the case of connection between wirings, each wiring must be stably coupled and stably electric-current-conducted.

Particularly, in the case of configuring a wiring structure by a branch line for providing a sensor or the like, a grommet or bracket or the like for coupling different wirings and fixing the same must be coupled. At this time, there is a possibility that any rotation or distortion between the pre-coupled wirings may occur in the process of forming the grommet or bracket.

In this case, the coupling and electric-current-conducting state between the wirings are difficult to be reliably formed. Furthermore, there is a possibility that a safety accident or the like may occur due to a poor coupling and electric-current-conducting state or an electric vehicle may malfunction.

Korean Patent Laid-Open Publication No. 10-2021-0084963 discloses a grommet for vehicle having rotation and distortion prevented. Specifically, it discloses a grommet for a vehicle capable of preventing rotation and distortion of a grommet using a mixed grommet for vehicle that can be applied and placed in various situations by fusing a target-type grommet and a curling-type grommet.

By the way, the grommet for vehicle disclosed in the above related art document is prevented from rotating by the anti-rotation protrusions being caught by the vehicle body and the bracket when vibration of the vehicle body or external force occurs. That is, the above related art document does not provide a method for preventing rotation of a wiring and a grommet for vehicle itself when coupling a grommet for vehicle and a wiring.

Korean utility model registration No. 20-0416265 discloses a fixing structure of a power cable for an electric vehicle. Specifically, it discloses a fixing structure of a power cable for an electric vehicle, in which rotation of a connector can be prevented by an anti-rotation protrusion protruding to a side of a molding portion located at one end of the power cable and a latching jaw provided in a fixer.

However, the fixing structure of the power cable for an electric vehicle disclosed in the above related art document has a limitation that can be applied to only a connector. That is, the above related art document does not provide a method for preventing rotation of each wiring or a grommet coupled thereto when coupling a plurality of wirings without a separate connector.

RELATED ART DOCUMENT

Patent Document

Korean Laid-Open Patent Publication No. 10-2021-0084963 (2021 Jul. 8.)

Korean Utility Registration No. 20-0416265 (2006 May 15.)

SUMMARY

Technical Problem

The present disclosure is to solve the above problems, and is directed to providing a wire coupling structure and a method for installing the same, having a structure capable of preventing a wire member from being disconnected by rotation when coupling to the wire member.

The present disclosure is also directed to providing a wire coupling structure and a method for installing the same, having a structure capable of preventing arbitrary rotation of each wire member when a plurality of wire members are coupled.

The present disclosure is also directed to providing a wire coupling structure and a method for installing the same, having a structure capable of being easily manufactured and installed.

The present disclosure is also directed to providing a wire coupling structure and a method for installing the same, having a structure capable of miniaturization in size.

The present disclosure is also directed to providing a wire coupling structure and a method for installing the same, having a structure capable of reducing weight while securing sufficient rigidity.

The present disclosure is also directed to providing a wire coupling structure and a method for installing the same, having a structure capable of easily performing connection and electric-current-conduction of each wire without a separate member for electrical connection, such as a connector.

The problems of the present disclosure are not limited to those mentioned above, and other problems not mentioned will be clearly understood by those of ordinary skill in the art from the following description.

Technical Solution

According to an aspect of the present disclosure, provided is a wire coupling structure, including a fixer coupled to an external wire; a grommet surrounding the fixer and coupled to the wire and the fixer; and a bracket surrounding the grommet and coupled to the grommet, wherein the fixer comprises: a fixing body surrounding the wire from the radial outside; and a fixing protrusion continuous with the fixing body and protruding outward and exposed outward of the grommet, and wherein the bracket comprises: an arm body surrounding the grommet from the radial outside; and a fixing groove formed through the inside of the arm body and coupled to the fixing protrusion.

In this case, in the wire coupling structure, the fixing body may have a width in one direction, and the fixing protrusion may have an extension length in the one direction longer than an extension length in the other direction.

In addition, in the wire coupling structure, the fixing body may be rounded to be convex outward and extended to have an arc-shaped cross-section having a center positioned therein, and the fixing protrusion may have an extension length in the one direction longer than an extension length in a direction along an extension direction of the fixing body.

In this case, in the wire coupling structure, the fixing protrusion may be formed in a polygonal pillar shape, having a length in the one direction, a width in a direction toward the fixing body, and a thickness in a direction in which the fixing body extends.

In addition, in the wire coupling structure, the fixing body may be formed to be rounded to be convex outward and to have an arc-shaped cross-section having a center positioned therein, and a plurality of fixing protrusions may be provided, and the plurality of fixing protrusions may be disposed to be spaced apart from each other along an extension direction of the arm body.

In this case, in the wire coupling structure, the arm body may be formed to be rounded to be convex outward and to have an arc-shaped cross-section having a center positioned therein, and a plurality of fixing grooves may be formed, and the plurality of fixing grooves may be disposed to be spaced apart from each other along an extension direction of the arm body.

In addition, in the wire coupling structure, the plurality of fixing protrusions may be coupled to the plurality of fixing grooves, respectively.

In this case, in the wire coupling structure, the fixing body may include a coupling opening formed between each end of the fixing body in an extension direction; and an insertion space located radially inside the fixing body, communicating with the coupling opening and accommodating the wire.

In addition, in the wire coupling structure, the fixing body may be formed of an elastic material, and the coupling opening may be configured to be expanded or contracted by an external force.

In this case, in the wire coupling structure, the wire may include: a main wire coupled to the fixer; and a sub wire branched from the main wire and electric-current-conducted with the main wire, and the grommet may include a main body surrounding the fixer and the main wire and coupled to the fixer and the main conductive wire and extending along an extension direction of the main wire; and a sub body continuous with the main body and surrounding the sub wire and coupled to the sub wire and extending along an extension direction of the sub wire.

In addition, in the wire coupling structure, the grommet may include a main hollow formed through the inside of the main body to accommodate the fixer and the main wire; and a sub hollow formed through the inside of the sub body to accommodate the sub wire, and communicating with the main hollow.

In this case, in the wire coupling structure, the main body and the sub body may extend at a predetermined angle.

In addition, in the wire coupling structure, the bracket may include a bracket body coupled to an external component; a bracket arm continuous with the bracket body, and coupled to the wire or the grommet including the arm body and the fixing groove; and a coupling space partially surrounded by the bracket arm, and accommodating the wire or the grommet.

In this case, in the wire coupling structure, the bracket arm may include a first bracket arm continuous with one side of the bracket body, and coupled to one side of the wire; and a second bracket arm continuous with the other side of the bracket body, and coupled to the other side of the wire.

In addition, in the wire coupling structure, the arm body may be formed to be rounded to be convex outward and to have an arc-shaped cross-section having a center positioned therein, and the bracket arm may include a slimming groove formed through the inside of the arm body, and extending along an extension direction of the arm body.

In this case, in the wire coupling structure, the bracket arm may include a pressing protrusion positioned at an end of the arm body, and configured to be extending at a predetermined angle with the arm body to be pressed by an external force.

In addition, according to an aspect of the present disclosure, a method for installing a wire coupling structure may be provided, the method including (a) coupling a fixer to a main wire; (b) coupling the main wire and the fixer; and (c) coupling a bracket to the main wire and the fixer.

In this case, in the method for installing a wire coupling structure, the step (a) may include (a1) forming a sub wire branched from the main wire; and (a2) coupling the fixer adjacent to a portion where the main wire and the sub wire are branched.

In addition, in the method for installing a wire coupling structure, the step (b) may include (b1) disposing the main wire and the fixer in a mold; and (b2) injecting a resin into the mold to injection molding a grommet, and coupling the injection molded grommet and the main wire, respectively.

In this case, in the method for installing a wire coupling structure, the step (c) may include (c1) accommodating a grommet coupled to the main wire and the fixer, respectively, in a coupling space of the bracket; (c2) coupling a fixing protrusion formed in the fixer to a fixing groove formed in the bracket; and (c3) pressing a bracket arm of the bracket to shape-deform the bracket arm to surround the grommet.

Advantageous Effects

According to the above configuration, the wire coupling structure and the method for installing the same according to an embodiment of the present disclosure can prevent a wire member from being disconnected by rotation when coupling to the wire member.

Further, according to the above configuration, the wire coupling structure and the method for installing the same according to an embodiment of the present disclosure can prevent arbitrary rotation of each wire member when a plurality of wire members are coupled.

Further, according to the above configuration, the wire coupling structure and the method for installing the same according to an embodiment of the present disclosure can be easily manufactured and installed.

Further, according to the above configuration, the wire coupling structure and the method for installing the same according to an embodiment of the present disclosure can be smaller in size.

Further, according to the above configuration, the wire coupling structure and the method for installing the same according to an embodiment of the present disclosure can be reduced in weight while securing sufficient rigidity.

Further, according to the above configuration, the wire coupling structure and the method for installing the same according to an embodiment of the present disclosure can easily perform connection and electric-current-conduction of each wire without a separate member for electrical connection such as a connector.

Advantageous effects of the present disclosure are not limited to the above-described effects, and should be understood to include all effects that can be inferred from the configuration of the disclosure described in the detailed description or claims of the present disclosure.

DETAILED DESCRIPTION OF THE EMBODIMENTS

Figure 1:
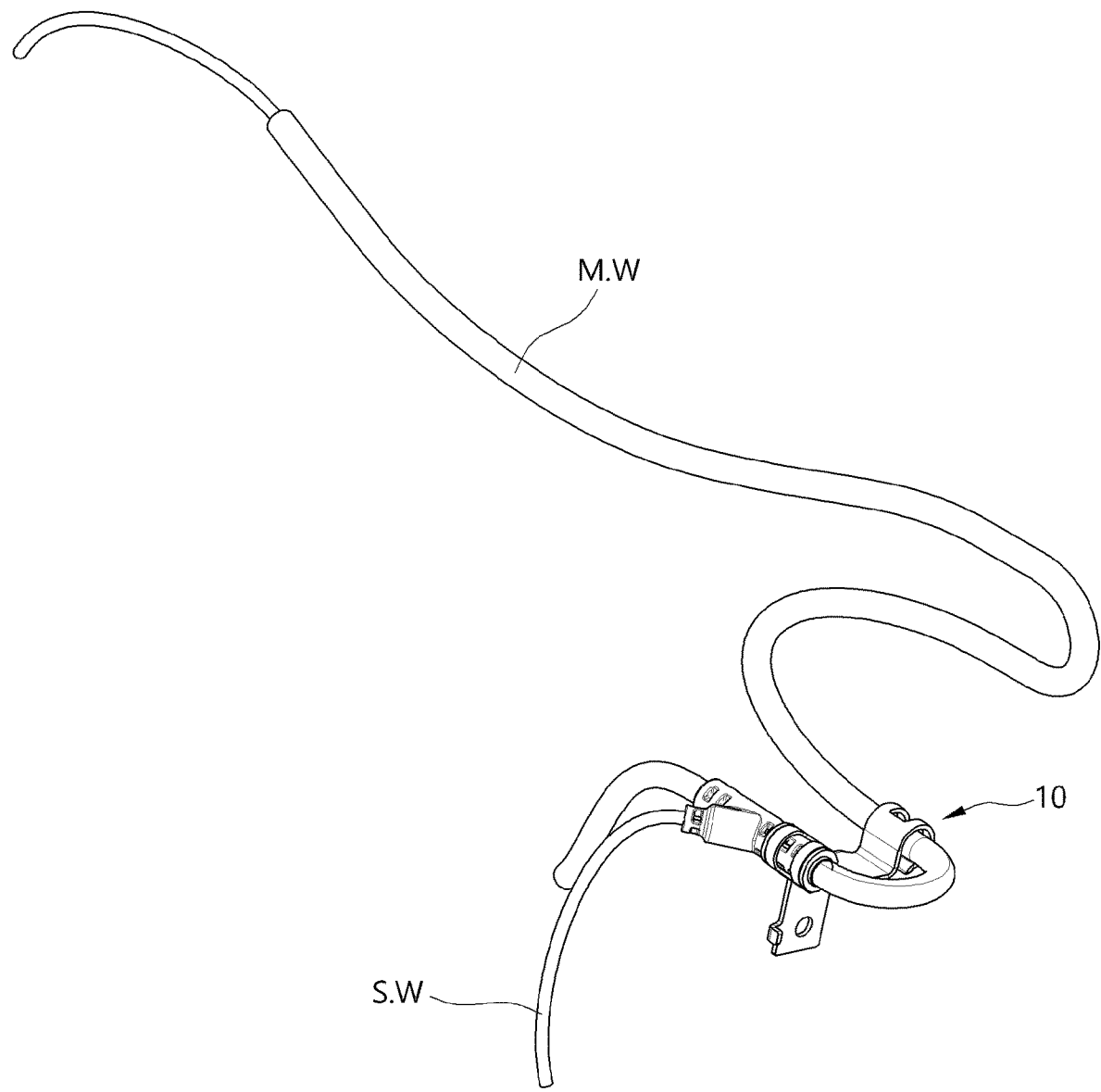
FIG. 1 is a perspective view illustrating a state in which a wire coupling structure according to an embodiment of the present disclosure is coupled to a main wire and a sub wire.

Hereinafter, exemplary embodiments of the present disclosure will be described in detail so that those of ordinary skill in the art can readily implement the present disclosure with reference to the accompanying drawings. The present disclosure may be embodied in many different forms and are not limited to the embodiments set forth herein. In the drawings, parts unrelated to the description are omitted for clarity of description of the present disclosure, and throughout the specification, like reference numerals denote like elements.

Terms and words used in the present specification and claims should not be construed as limited to their usual or dictionary definition, and they should be interpreted as a meaning and concept consistent with the technical idea of the present disclosure based on the principle that inventors may appropriately define the terms and concept in order to describe their own disclosure in the best way.

Accordingly, the embodiments described in the present specification and the configurations shown in the drawings correspond to preferred embodiments of the present disclosure, and do not represent all the technical idea of the present disclosure, so the configurations may have various examples of equivalent and modification that can replace them at the time of filing the present disclosure.

In the following description, in order to clarify the features of the present disclosure, descriptions of some components may be omitted.

The term "communication" used in the following description means that one or more members are connected to each other so as to be in fluid communication. In an embodiment, communication may be formed by a member such as a conduit, a pipe, a tubing, or the like. In the following description, communication may be used in the same sense as one or more members are being "fluidically connected" to each other.

The term "electric-current-conducting" used in the following description means that one or more members are connected to each other so as to transmit a current or an electric signal. In an embodiment, the electric-current-conducting may be formed in a wired form by a wire member or the like or in a wireless form such as Bluetooth, Wi-Fi, RFID, or the like. In an embodiment, the electric-current-conducting may include the meaning of "communication".

The terms "upper side", "lower side", "left side", "right side", "front side", and "rear side" used in the following description will be understood with reference to the coordinate system shown in FIG. 3.

Figure 2:
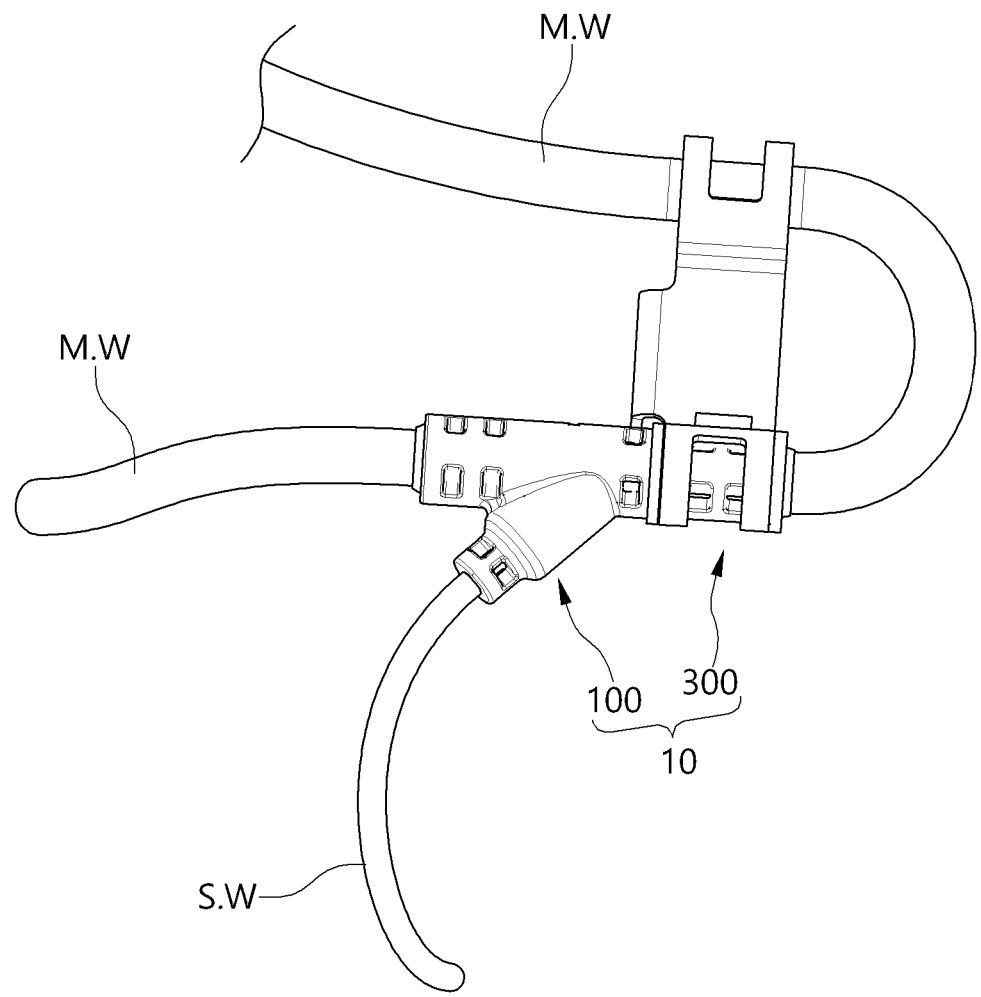
FIG. 2 is a part enlarged perspective view illustrating the state of FIG. 1.

Referring to FIGS. 1 to 2, a state in which a wire coupling structure 10 according to an embodiment of the present invention is coupled to a main wire M.W and a sub wire S.W is illustrated. In this case, the sub wire S.W is branched from the main wire M.W in the form of a branch line of the main wire M.W.

In the above state, the wire coupling structure 10 is configured to support both the main wire M.W and the sub wire S.W. In this case, even if a process of coupling the wire coupling structure 10 to the main wire M.W and the sub wire S.W is performed, the main wire M.W and the sub wire S.W supported by the wire coupling structure 10 are not arbitrarily rotated with respect to each other.

Accordingly, a distortion phenomenon of the main wire M.W or the sub wire S.W may be prevented, and thus a disconnection of the main wire M.W and the sub wire S.W may be prevented. Accordingly, branching and electric-current-conducting states of the main wire M.W and the sub wire S.W may be stably maintained.

The main wire M.W and the sub wire S.W may be provided in any form capable of being electric-current-conducting with an external power source or a load. In an embodiment, the main wire M.W and the sub wire S.W may include an electric-current-conducting member formed of a conductive material, for example, copper (Cu), therein and an insulating member surrounding the electric-current-conducting member from the outside and formed of a non-conductive material, for example, rubber or a synthetic resin material.

In this case, the wire coupling structure 10 may be coupled to the main wire M.W in a plurality of portions and may be coupled to the sub wire S.W in a singular portion. In the illustrated embodiment, the left end and the right end of the wire coupling structure 10 are coupled to the main wire M.W, respectively. In this case, the left end of the wire coupling structure 10 may also be coupled to the sub wire S.W and simultaneously support them.

It is assumed that the wire coupling structure 10 according to the present embodiment is provided in a sensor or the like provided in a vehicle. Alternatively, the wire coupling structure 10 may be provided in any configuration that needs to support the main wire M.W and the sub wire S.W in a narrow space.

Figure 3:
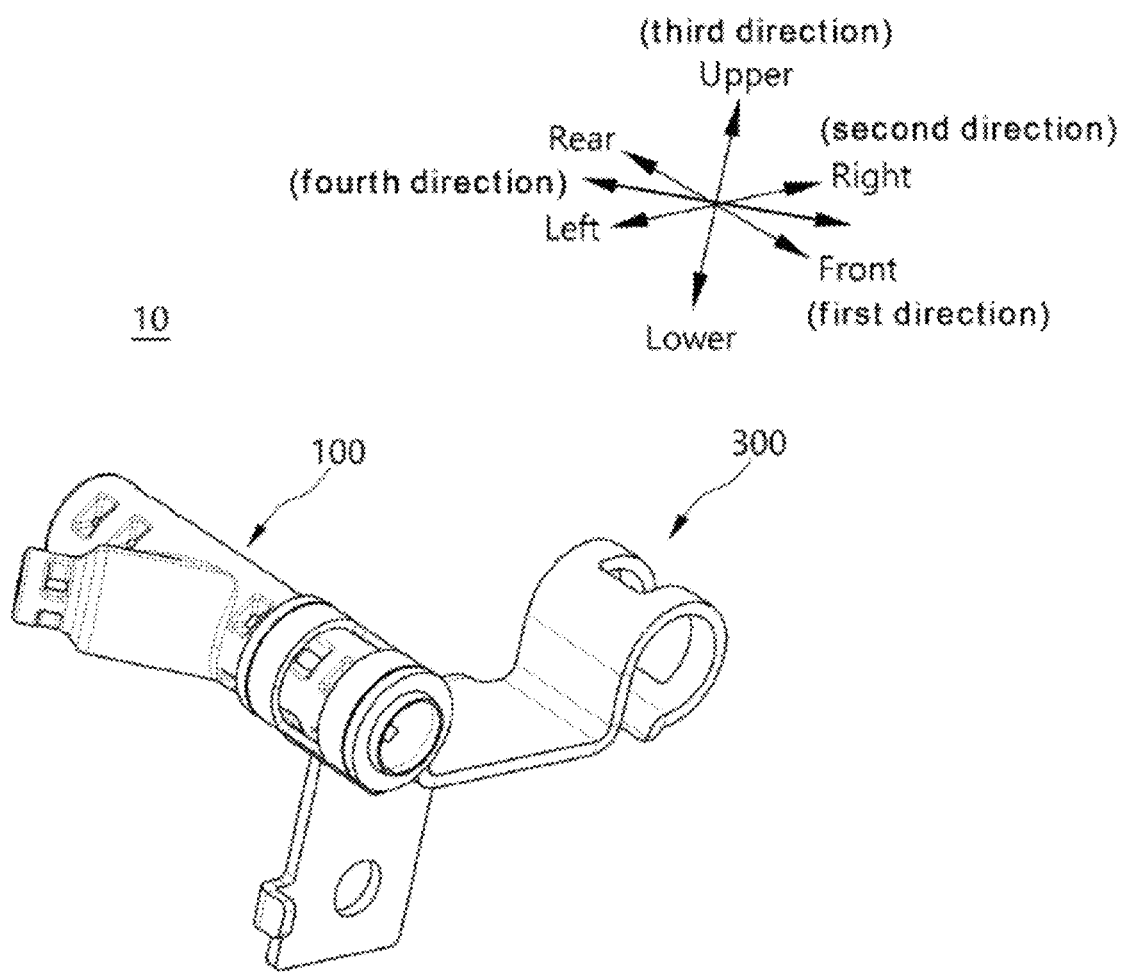
FIG. 3 is a perspective view illustrating the wire coupling structure of FIG. 1.
Figure 4:
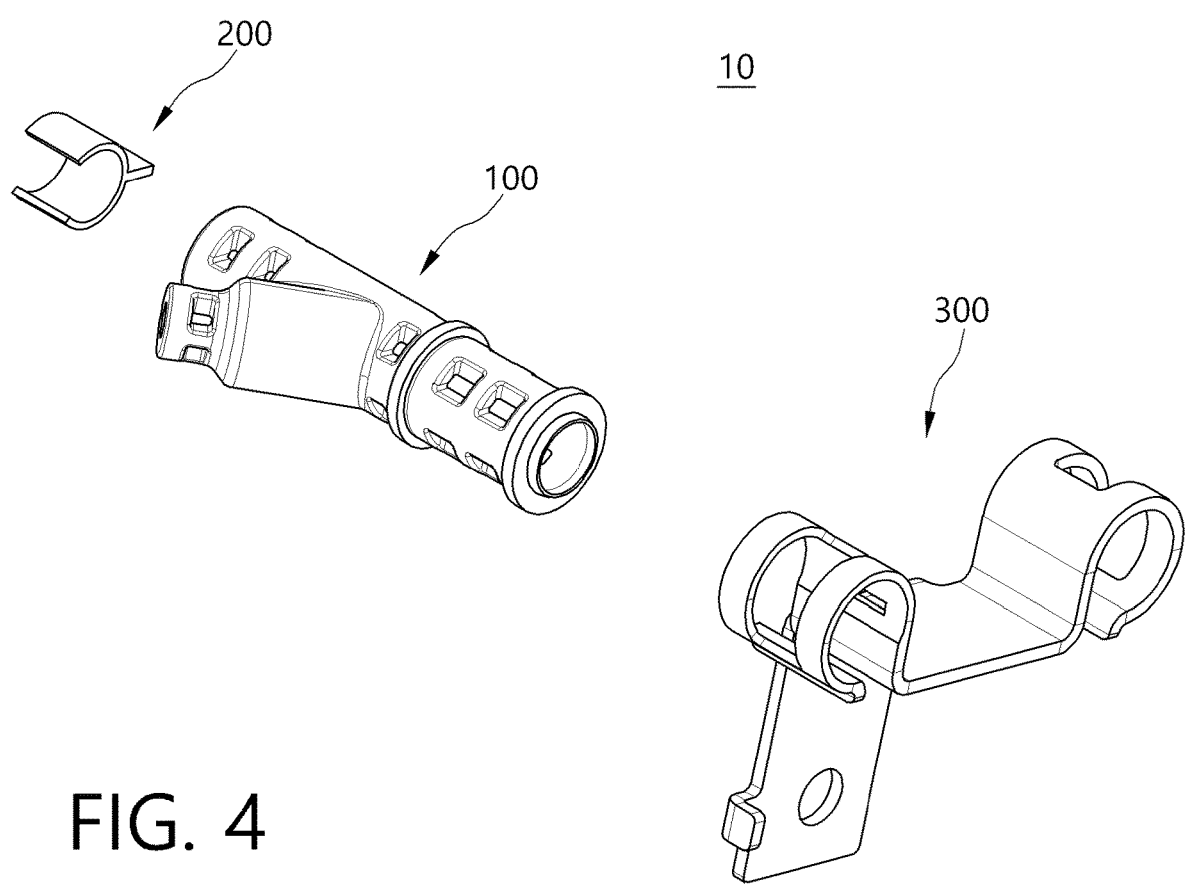
FIG. 4 is an exploded perspective view illustrating the wire coupling structure of FIG. 3.

In the embodiment shown in FIGS. 3 to 4, the wire coupling structure 10 includes a grommet 100, a fixer 200, and a bracket 300.

The grommet 100 is coupled to the main wire M.W and the sub wire S.W, respectively, and supports them. The main wire M.W and the sub wire S.W may be coupled to each other by the grommet 100 and maintained in an electric-current-conducting state.

A space is formed inside the grommet 100. The main wire M.W, the sub wire S.W, and the fixer 200 coupled to the main wire M.W to prevent the rotation of the wire coupling structure 10 are accommodated in the space. The space communicates with the outside. Accordingly, the main wire M.W and the sub wire S.W may be penetrated through the space. In addition, some components of the fixer 200 may be exposed to the outside of the space.

The grommet 100 is coupled to the bracket 300. The grommet 100 may be accommodated in a space formed inside the bracket 300 and supported by the bracket 300. In this case, some components of the fixer 200 described above may be coupled to the bracket 300, and rotation of the grommet 100 may be prevented even when the bracket 300 is bent.

The grommet 100 may be formed of an insulating material. This is to prevent any electric-current-conducting between the bracket 300 and the main wire M.W and the sub wire S.W supported by the grommet 100.

The grommet 100 may be formed of a material having easy processability. In an embodiment, the grommet 100 may be injection molded while surrounding the main wire M.W and the sub wire S.W, and the fixer 200 coupled to the main wire M.W from the outside. In an embodiment, the grommet 100 may be formed of a synthetic resin material, such as plastic.

Figure 5:
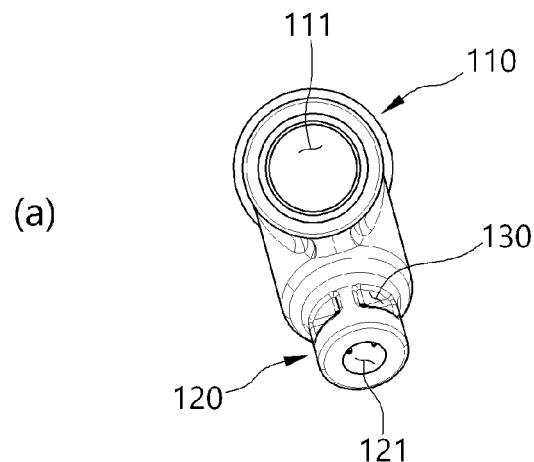
FIG. 5 is a perspective view illustrating a grommet provided in the wire coupling structure of FIG. 3.
Figure 5:
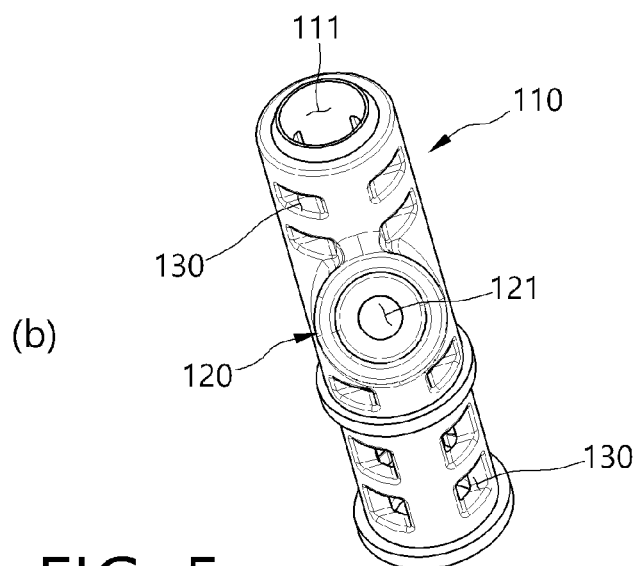

In the embodiment shown in FIG. 5, the grommet 100 includes a main body 110, a sub body 120, and a through hole 130.

The main body 110 forms one component of the grommet 100. A space may be formed inside the main body 110, and the main wire M.W may be accommodated in the space. As described above, the main wire M.W may be penetrated into the space of the main body 110.

The main body 110 is coupled to the fixer 200. The main wire M.W and the fixer 200 are sequentially accommodated in the space formed in the main body 110. In other words, the fixer 200 and the main body 110 are sequentially disposed radially outward in the main wire M.W.

The main body 110 is coupled to the sub body 120. In an embodiment, the main body 110 may extend at a predetermined angle with the sub body 120. In the illustrated embodiment, the main body 110 may extend at an acute angle with the sub body 120. The coupling structure between the main body 110 and the sub body 120 may be changed according to the branch structure of the main wire M.W and the sub wire S.W.

A plurality of through holes 130 are formed in the main body 110. The through hole 130 may reinforce the rigidity of the main body 110, and at the same time may achieve light weighting of the main body 110.

The main body 110 may have any shape capable of accommodating the main wire M.W and the fixer 200 and being coupled to the sub body 120. In the illustrated embodiment, the main body 110 is formed in a cylindrical shape extending in the front-rear direction and having a hollow penetrating formed therein.

In the illustrated embodiment, the main body 110 includes a main hollow 111.

The main hollow 111 is a space formed inside the main body 110. The main hollow 111 extends in the extension direction of the main body 110, i.e., in the front-rear direction in the illustrated embodiment. Each end of the main hollow 111 in the extension direction, the front side end and the rear side end in the illustrated embodiment, are formed open and communicate with the outside. In other words, the main hollow 111 is formed through the inside of the main body 110 along its extension direction.

The main hollow 111 accommodates the main wire M.W and the fixer 200 coupled to the main wire M.W. As will be described later, any rotation of the grommet 100 may be prevented by the fixer 200 even during bending processing of the bracket 300.

The main hollow 111 communicates with a sub hollow 121 formed in the sub body 120. The sub wire S.W may be branched from the main wire M.W while being accommodated in the sub hollow 121.

The main hollow 111 communicates with the outside through the through hole 130. As will be described later, a plurality of through holes 130 may be formed. A fixing protrusion 230 of the fixer 200 may be penetrated through any one of the plurality of through holes 130. The fixing protrusion 230 may be exposed to the outside through the any one through hole 130 and may be coupled to a fixing groove 324 of the bracket 300.

The sub body 120 forms another component of the grommet 100. A space may be formed inside the sub body 120, and the sub wire M.W may be accommodated in the space. As described above, the sub wire S.W may be penetrated into the space of the sub body 120.

The sub body 120 is coupled to and continuous with the main body 110. In an embodiment, the sub body 120 may extend at a predetermined angle with the main body 110. In the illustrated embodiment, the sub body 120 may extend at an acute angle with the main body 110. As described above, the coupling structure between the main body 110 and the sub body 120 may be changed according to the branch structure of the main wire M.W and the sub wire S.W.

A plurality of through holes 130 are formed in the sub body 120. The through hole 130 may reinforce the rigidity of the sub body 120, and at the same time may achieve light weighting of the sub body 120.

The sub body 120 may have any shape capable of accommodating the sub wire S.W and being coupled to the main body 110. In the illustrated embodiment, the sub body 120 is formed in a cylindrical shape extending toward the front right side and the rear left side and having a hollow penetrating formed therein. In this case, the extension length of the sub body 120 may be equal to or less than the extension length of the main body 110.

In the illustrated embodiment, the sub body 120 includes a sub hollow 121.

The sub hollow 121 is a space formed inside the sub body 120. Each end of the sub hollow 121 in the extension direction of the sub body 120, i.e., the front right end and the rear left end in the illustrated embodiment, is formed open and communicates with the outside. In other words, the sub hollow 121 is formed through the inside of the sub body 120 along its extension direction.

The sub hollow 121 accommodates the sub wire S.W. The sub hollow 121 communicates with the main hollow 111 formed in the main body 110. One end of the sub wire S.W accommodated in the sub hollow 121, i.e., the front side end in the illustrated embodiment, may be coupled to the main wire M.W.

The sub hollow 121 communicates with the outside through the through hole 130.

The through hole 130 is formed through the outer circumference of the main body 110 or the sub body 120. The through hole 130 communicates the main hollow 111 or the sub hollow 121 with the outside. The rigidity of the main body 110 or the sub body 120 may be reinforced by the through hole 130. In addition, the fixing protrusion 230 of the fixer 200 accommodated in the main hollow 111 may protrude to the outside through the through hole 130.

The through hole 130 may have any shape capable of communicating the main hollow 111 or the sub hollow 121 with the outside. In the illustrated embodiment, the through hole 130 has a quadrangular cross-section and has a polygonal pillar shape with a height in a radial direction.

A plurality of through holes 130 may be formed. The plurality of through holes 130 may be disposed to be spaced apart from each other to communicate the main hollow 111 or the sub hollow 121 with the outside at various positions. In the illustrated embodiment, the through holes 130 are disposed to be spaced apart from each other in the outer circumferential direction and the longitudinal direction of the main body 110, and are disposed to be spaced apart from each other along the outer circumferential direction of the sub body 120.

As the through hole 130 is formed in the outer circumferential surfaces of the main body 110 and the sub body 120, frictional force of the main wire M.W and the sub wire S.W with the inner circumference of the main body 110 and the inner circumference of the sub body 120 may be increased. In addition, frictional force between the outer circumference of the main body 110 and the bracket 300 may be increased.

Accordingly, even during bending processing of the bracket 300, relative rotation of the bracket 300 and the grommet 100 may be prevented.

The fixer 200 is accommodated in the inner space of the grommet 100, specifically, in the main hollow 111.

The fixer 200 is coupled to the main wire M.W, the grommet 100, and the bracket 300, respectively. Some components of the fixer 200 are coupled to the main wire M.W and accommodated inside the grommet 100. Another component of the fixer 200 passes through the through hole 130 formed in the grommet 100 and is exposed to the outside. The another component is coupled to the bracket 300.

Thus, even when the bracket 300 is bent to surround the grommet 100 while being coupled to the grommet 100 and the fixer 200, the rotation of the grommet 100 may be prevented. Accordingly, the rotation of the main wire M.W and the sub wire S.W accommodated in the grommet 100 is also prevented, so that the branching and electric-current-conducting states of the main wire M.W and the sub wire S.W may be stably maintained.

The fixer 200 is coupled to the main wire M.W. The main wire M.W may be inserted and coupled to an insertion space 220 formed inside the fixer 200.

The fixer 200 is coupled to the grommet 100. As will be described later, the grommet 100 may be injection molded while the fixer 200 is coupled to the main wire M.W so that the fixer 200 and the grommet 100 may be coupled. That is, the fixer 200 is surrounded by the grommet 100 and coupled to the grommet 100.

The fixer 200 is coupled to the bracket 300. The other component of the fixer 200, that is, the fixing protrusion 230 to be described later, is exposed to the outside through any one of the through holes 130 formed in the grommet 100. The exposed fixing protrusion 230 is inserted and coupled to the fixing groove 324 of the bracket 300.

Accordingly, even during bending processing of the bracket 300, the rotation of the fixer 200 and the grommet 100 coupled thereto may be prevented.

The fixer 200 may be formed of a lightweight yet highly rigid material. In addition, the fixer 200 may be formed of a heat-resistant material. Further, the fixer 200 may be formed of an elastic material capable of undergoing a predetermined shape transformation and returning to its original shape. In an embodiment, the fixer 200 may be formed of a synthetic resin material, such as plastic.

Figure 6:
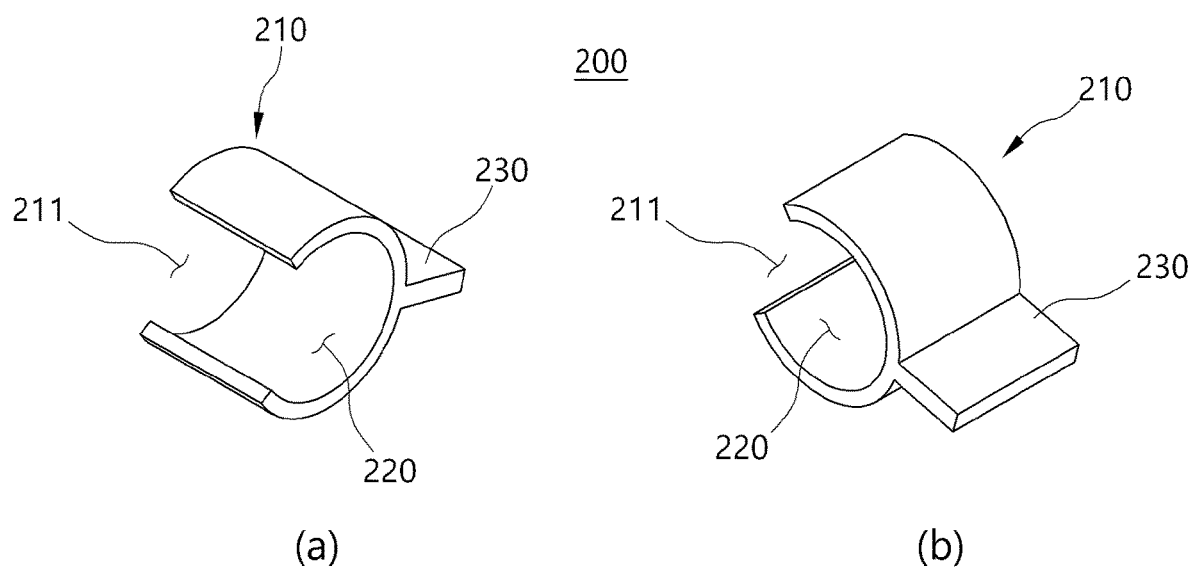
FIG. 6 is a perspective view illustrating a fixer provided in the wire coupling structure of FIG. 3.

In the embodiment shown in FIG. 6, the fixer 200 includes a fixing body 210, an insertion space 220, and a fixing protrusion 230.

The fixing body 210 forms one component of the fixer 200. The fixing body 210 is formed to partially surround the insertion space 220. Accordingly, the fixing body 210 may partially surround the main wire M.W accommodated in the insertion space 220.

The fixing body 210 may have any shape capable of accommodating the main wire M.W. In the illustrated embodiment, the fixing body 210 has an arc-shaped cross-section and is formed to have a height in a front-rear direction. The shape of the fixing body 210 may be changed according to the shape of the main wire M.W or the main body 110.

In the illustrated embodiment, the fixing body 210 includes a coupling opening 211.

The coupling opening 211 is a space formed between each end of the fixing body 210 in the extension direction. In the illustrated embodiment, the coupling opening 211 is defined as a space formed by the upper and lower ends of the left side of the fixing body 210 being spaced apart from each other.

The coupling opening 211 communicates the insertion space 220 and the outside. The main wire M.W may be accommodated into the insertion space 220 through the coupling opening 211. As described above, the fixer 200 may be formed of a predetermined elastic material. Therefore, the coupling opening 211 may be formed to have a height equal to or less than a diameter of a cross-section of the main wire M.W.

That is, the coupling opening 211 may be expanded by shape-deforming the fixing body 210 so that each of the ends of the fixing body 210 are far away from each other, and thus may pass the main wire M.W through. When the main wire M.W is accommodated in the insertion space 220, the fixing body 210 may be deformed in shape and contracted by a stored restoring force while each of the ends is moved toward each other. Accordingly, arbitrary detachment of the main wire M.W accommodated in the insertion space 220 may be prevented.

A space formed inside the fixing body 210 is defined as an insertion space 220.

The insertion space 220 is a space for accommodating the main wire M.W. The insertion space 220 is defined by being partially surrounded by the fixing body 210. In the illustrated embodiment, the upper side, the lower side, and the right side of the insertion space 220 are surrounded by the fixing body 210. The left side of the insertion space 220 is communicated with the outside by the coupling opening 211.

In addition, the front side and the rear side of the insertion space 220 may be formed open so that the main wire M.W accommodated in the insertion space 220 may extend outward of the insertion space 220.

The insertion space 220 may have any shape capable of accommodating the main wire M.W. In the illustrated embodiment, the insertion space 220 is a cylindrical space formed open on one side facing the coupling opening 211, i.e., on the left side.

The fixing protrusion 230 is formed on the other side of the portions of the fixing body 210 opposite to the coupling opening 211, i.e., on the right side in the illustrated embodiment.

The fixing protrusion 230 is a portion where the fixer 200 is coupled to the grommet 100 and the bracket 300. The fixing protrusion 230 is positioned opposite to the coupling opening 211. In the illustrated embodiment, the fixing protrusion 230 is coupled to the right outer circumference of the fixing body 210.

The fixing protrusion 230 is formed to protrude toward the outside of the insertion space 220. In the illustrated embodiment, the fixing protrusion 230 is formed to protrude toward the right side from the right outer circumference of the fixing body 210. The protruding length of the fixing protrusion 230 is preferably sufficiently long to be inserted or penetrated and coupled into the fixing groove 324 provided in the bracket 300.

The fixing protrusion 230 is coupled through any one of the plurality of through holes 130 formed in the grommet 100. As described above, the grommet 100 is injection-molded into the fixer 200 coupled to the main wire M.W. Therefore, the fixing protrusion 230 may be said to be coupled through any portion of the grommet 100.

The fixing protrusion 230 is coupled through the fixing groove 324 of the bracket 300. The fixer 200 and the grommet 100 may be prevented from any rotation by coupling the fixing protrusion 230 and the fixing groove 324.

The fixing protrusion 230 may have any shape that may be penetrated through the fixing groove 324 and prevent any rotation of the bracket 300. In the illustrated embodiment, the fixing protrusion 230 is formed in a quadrangular plate shape having a length in the front-rear direction, a width in the left-right directions, and a thickness in the up-down direction.

In the above embodiment, the fixing protrusion 230 extends in the extension direction of the fixing body 210, i.e., in the front-rear direction in the illustrated embodiment. In this case, the length of the fixing protrusion 230 in the width direction, i.e., in the left-right direction in the illustrated embodiment, may be shorter than the length in the front-rear direction.

In other words, the fixing protrusion 230 may be formed to have a length in a direction along the extension direction of the main wire M.W accommodated in the insertion space 220 longer than a length in the radial direction. Accordingly, the rotation of the fixing protrusion 230 accommodated in the fixing groove 323 and the fixing body 210 coupled thereto may be effectively prevented.

The shape of the fixing protrusion 230 may be changed to correspond to the shape of the fixing groove 323.

The above-described fixer 200 may be modified in various forms to accommodate the main wire M.W, and to be coupled to the grommet 100 and the bracket 300 to prevent rotation.

Figure 7:
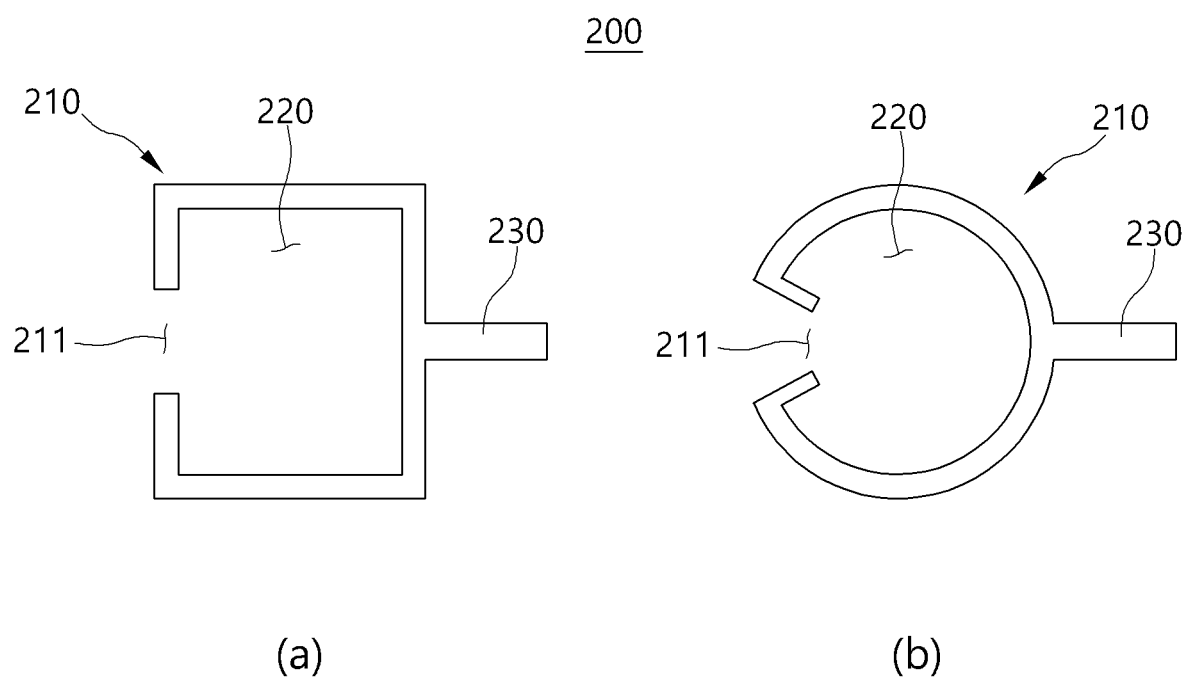
FIG. 7 is a side view illustrating another embodiment of the fixer of FIG. 6.

In the embodiment shown in FIG. 7(a), the fixing body 210 is formed to have a quadrangular cross-section. In this case, the upper end and the lower end of the left side of the fixing body 210 are spaced apart from each other, and a coupling opening 211 is formed therebetween.

In the embodiment shown in FIG. 7(b), the fixing body 210 is formed to have a circular cross-section. In this case, the upper end and the lower end of the left side of the fixing body 210 extend inclined toward the insertion space 220, respectively. The upper end and the lower end of the left side of the fixing body 210 are spaced apart from each other and a coupling opening 211 is formed therebetween.

The fixer 200 may be coupled to the bracket 300 to prevent rotation.

The bracket 300 supports the main wire M.W and the grommet 100 coupled to the main wire M.W. The bracket 300 may be coupled to the main wire M.W at a plurality of points.

In the embodiment shown in FIGS. 1 to 2, the bracket 300 is coupled to the main wire M.W at two points, respectively. In this case, the left portion of the bracket 300 is coupled to the main wire M.W and the grommet 100 coupled thereto, and the right portion of the bracket 300 is coupled to the main wire M.W to support them.

The bracket 300 is coupled to the grommet 100. The bracket 300 surrounds the main body 110 of the grommet 100 from the outside and is coupled to the grommet 100.

The bracket 300 is coupled to the fixer 200. As described above, the fixing protrusion 230 of the fixer 200 is inserted into or coupled through the fixing groove 324 of the bracket 300.

The bracket 300 may be formed of a highly rigid material. At the same time, the bracket 300 may be formed of a material capable of being deformed in shape by an external force and maintained in the deformed shape. In an embodiment, the bracket 300 may be formed of a metal material formed of iron (Fe), aluminum (Al), or an alloy thereof.

Figure 8:
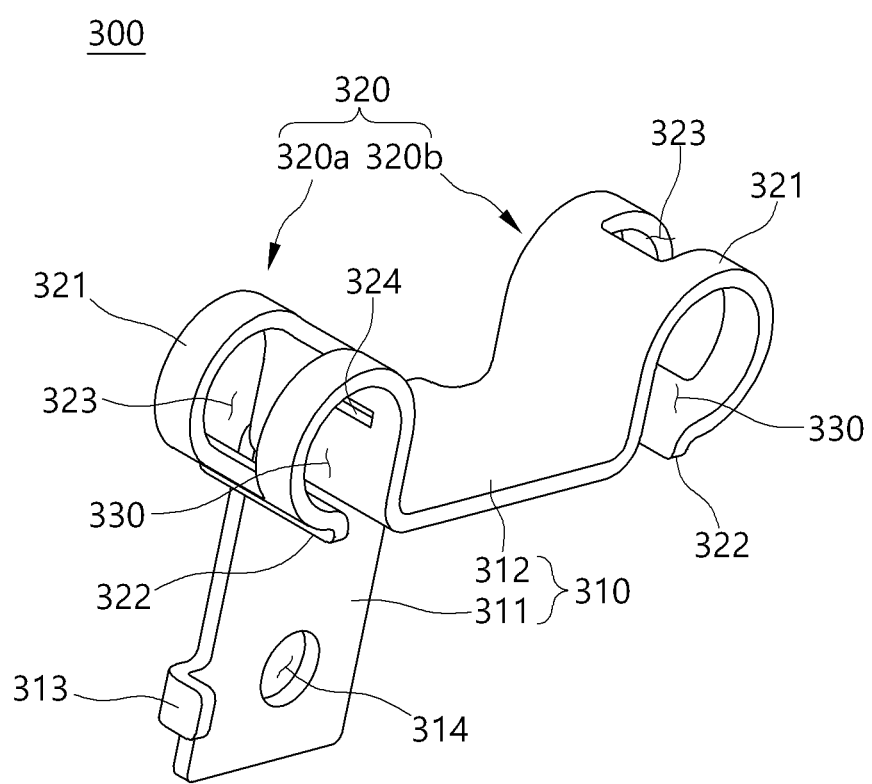
FIGS. 8 to 9 are perspective views illustrating brackets provided in the wire coupling structure of FIG. 3.
Figure 9:
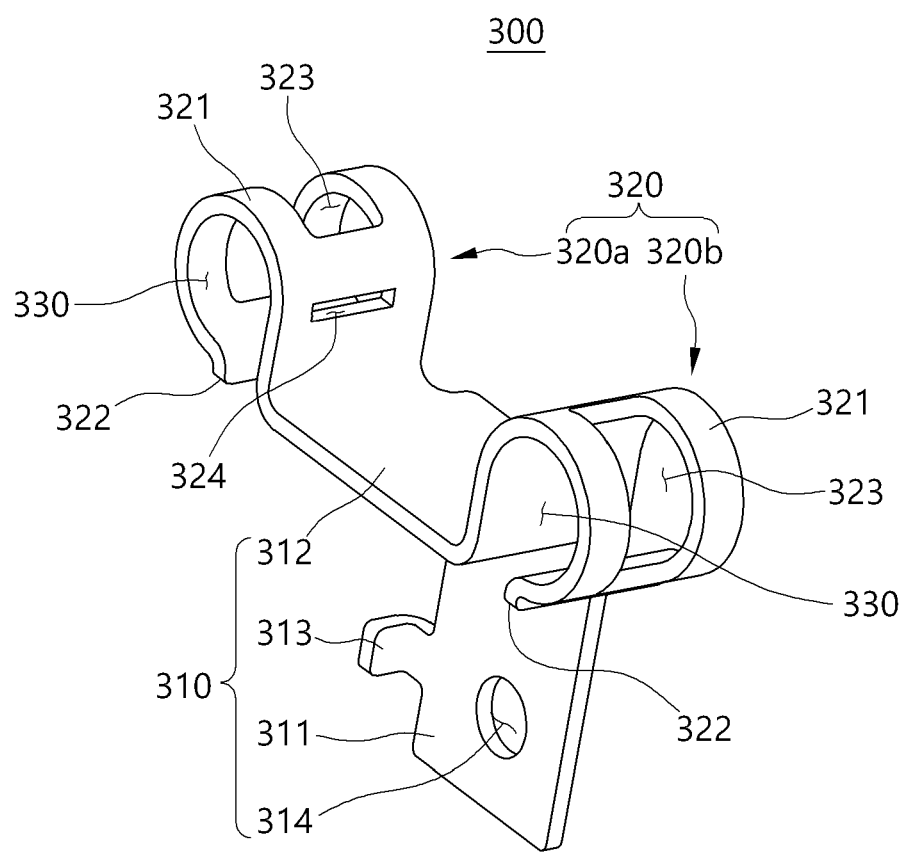

In the embodiment shown in FIGS. 8 to 9, the bracket 300 includes a bracket body 310, a bracket arm 320, and a coupling space 330.

The bracket body 310 forms one component of the bracket 300. The bracket body 310 may be formed to have a large surface area and may be coupled to another external component.

The bracket body 310 is coupled to the bracket arm 320. In the illustrated embodiment, one end of the bracket body 310 in the extension direction, i.e., the left and right ends of the upper side are coupled to the bracket arm 320.

In the illustrated embodiment, the bracket body 310 includes a first bracket body 311, a second bracket body 312, a coupling protrusion 313, and a coupling hole 314.

The first bracket body 311 forms one portion of the bracket body 310. The first bracket body 311 is coupled to the second bracket body 312. The first bracket body 311 is coupled to another external component.

The first bracket body 311 may have any shape that may be coupled to another external component and the second bracket body 312. In the illustrated embodiment, the first bracket body 311 is formed in a quadrangular plate shape having a height in the up-down direction, a width in the left-right direction, and a thickness in the front-rear direction.

In this case, the length of the first bracket body 311 in the up-down direction may be longer than the length in the left-right direction.

The second bracket body 312 forms another component of the bracket body 310. The second bracket body 312 is coupled to the first bracket body 311 and the bracket arm 320.

The second bracket body 312 may have any shape that may be coupled to the first bracket body 311 and the bracket arm 320. In the illustrated embodiment, the second bracket body 312 is formed in a quadrangular plate shape having a thickness in the up-down direction, a width in the left-right direction, and a length in the front-rear direction.

In this case, one end of the second bracket body 312 in the longitudinal direction, i.e., the rear end in the illustrated embodiment, is continuous with one end of the first bracket body 311 in the height direction, i.e., the upper end in the illustrated embodiment. The second bracket body 312 extends at a predetermined angle with the first bracket body 311. In an embodiment, the predetermined angle may be a right angle.

A first bracket arm 320a and a second bracket arm 320b are continuous at each end of the second bracket body 312 in the width direction, i.e., at the left end and the right end in the illustrated embodiment.

The coupling protrusion 313 forms one component in which the bracket body 310 is coupled to another external component. The coupling protrusion 313 is located at one end in the width direction of the first bracket body 311, i.e., at the left end in the illustrated embodiment.

The coupling protrusion 313 extends at a predetermined angle with the first bracket body 311. In the illustrated embodiment, the coupling protrusion 313 extends toward one side, that is, the front side, in the thickness direction of the first bracket body 311. In the above embodiment, the predetermined angle may be a right angle.

The coupling hole 314 forms another component in which the bracket body 310 is coupled to another external component. The coupling hole 314 is formed through the inside of the first bracket body 311. In the illustrated embodiment, the coupling hole 314 is biased to the other side, that is, the lower side, in the height direction of the first bracket body 311.

The coupling hole 314 may be any shape that may be coupled to another external component. In the illustrated embodiment, the coupling hole 314 is formed in a cylindrical space, having a circular cross-section and having a height in a thickness direction, that is, the front-rear direction of the first bracket body 311.

The bracket arm 320 forms another component of the bracket 300. The bracket arm 320 is a portion where the bracket 300 is coupled to the main wire M.W and the grommet 100 coupled to the main wire M.W.

The bracket arm 320 is coupled to the bracket body 310. In the illustrated embodiment, the bracket arm 320 is located at an end, i.e., a left end or a right end, in the extension direction of the second bracket body 312 forming an upper side of the bracket body 310.

A plurality of bracket arms 320 may be provided. The plurality of bracket arms 320 may be coupled to the second bracket body 312 and the main wire M.W at different positions, respectively.

In the illustrated embodiment, a pair of bracket arms 320 are provided, including a first bracket arm 320a and a second bracket arm 320b. The first bracket arm 320a is continuous with the left end of the second bracket body 312 and is coupled to the main wire M.W and the grommet 100. The second bracket arm 320b is continuous with the right end of the second bracket body 312 and is coupled to the main wire M.W.

The first bracket arm 320a and the second bracket arm 320b are coupled to the second bracket body 312 at different positions, but have the same structure. Accordingly, hereinafter, common parts will be described by collectively referring to the first bracket arm 320a and the second bracket arm 320b as the bracket arm 320.

The bracket arm 320 surrounds the main wire M.W or the fixer 200 and the grommet 100 coupled to the main wire M.W from the outside and is combined with them. To this end, the bracket arm 320 may be bent.

In the illustrated embodiment, the bracket arm 320 includes an arm body 321, a pressing protrusion 322, a slimming groove 323, and a fixing groove 324.

The arm body 321 forms one component of the bracket arm 320. The arm body 321 is a portion where the bracket arm 320 is coupled to the bracket body 310, specifically, the second bracket body 312.

The arm body 321 may extend outwardly rounded. In other words, the arm body 321 may be formed to have an arc-shaped cross-section. The arm body 321 may be formed to have a length in the extension direction of the second bracket body 312, i.e., in the front-rear direction in the illustrated embodiment.

A coupling space 330 is formed in the radially inside of the arm body 321. The arm body 321 is formed to surround the main wire M.W or the grommet 100 coupled thereto accommodated in the coupling space 330 from the outside radially.

The arm body 321 may be bent. That is, after the main wire M.W or the grommet 100 is accommodated in the coupling space 330, the arm body 321 may be bent to surround the main wire M.W or the grommet 100.

An end of the arm body 321 in the extension direction is defined as a pressing protrusion 322.

The pressing protrusion 322 is a portion where the arm body 321 is pressed to surround the main wire M.W or the grommet 100. The pressing protrusion 322 is located at an end of the arm body 321 in the extension direction. The pressing protrusion 322 may extend at a predetermined angle with the arm body 321. In the illustrated embodiment, the pressing protrusion 322 extends at an obtuse angle with the outer circumference of the arm body 321.

Accordingly, the operator may press the pressing protrusion 322 toward the second bracket body 312 to form the arm body 321 to surround the main wire M.W or the grommet 100.

The slimming groove 323 is formed through the inside of the arm body 321. The slimming groove 323 may extend in the longitudinal direction, that is, the front-rear direction, of the arm body 321 and may extend in the extension direction of the arm body 321, i.e., in the arc shape in the illustrated embodiment. The slimming groove 323 is surrounded by the arm body 321. In the illustrated embodiment, each end of the front side, the rear side, and the extension direction of the slimming groove 323 is surrounded by the arm body 321.

As the slimming groove 323 is formed, light weighting of the bracket 300 may be achieved. In addition, as the slimming groove 323 is formed, the frictional force of the portion where the arm body 321 is coupled to the grommet 100 is increased, and thus relative rotation of the bracket 300 and the grommet 100 may be prevented.

The slimming groove 323 communicates the coupling space 330 with the outside. Therefore, the main wire M.W or the grommet 100 coupled to the main wire M.W accommodated in the coupling space 330 may be visually perceived by the slimming groove 323.

The fixing groove 324 is a portion where the bracket 300 is coupled to the fixer 200. The fixing groove 324 accommodates the fixing protrusion 230 of the fixer 200. The fixing protrusion 230 may be inserted into or penetrated and coupled into the fixing groove 324.

The fixing groove 324 is formed through the inside of the arm body 321. The fixing protrusion 230 inserted into the fixing groove 324 is supported by an inner circumference of the arm body 321 surrounding the fixing groove 324. Accordingly, relative rotation of the fixer 200 and the bracket 300 may be prevented. As a result, rotation of the main wire M.W and the grommet 100 coupled to the fixer 200 may also be prevented.

The fixing groove 324 is located adjacent to the slimming groove 323. In this case, the fixing groove 324 is spaced apart from the slimming groove 323 and physically separated from the slimming groove 323. In the illustrated embodiment, the fixing groove 324 is positioned between the slimming groove 323 and the second bracket body 312.

The fixing groove 324 is formed to have a length in a width direction of the arm body 321, i.e., in a front-rear direction in the illustrated embodiment, and have a height in a longitudinal direction of the arm body 321, i.e., in a up-down direction in the illustrated embodiment. In this case, the length of the fixing groove 324 may be longer than the height thereof. In the illustrated embodiment, the fixing groove 324 is formed into a rectangular space, having a rectangular cross-section in which a length in the front-rear direction is longer than a length in the up-down direction, and having a thickness in the left-right direction.

The position and shape of the fixing groove 324 may be changed according to the position and shape of the fixing protrusion 230.

In the embodiment shown in FIGS. 8 to 9, a single fixing groove 324 is provided and formed only in the first bracket arm 320a. Alternatively, a plurality of fixing grooves 324 may be provided and formed in the first bracket arm 320a and the second bracket arm 320b, respectively.

Figure 10:
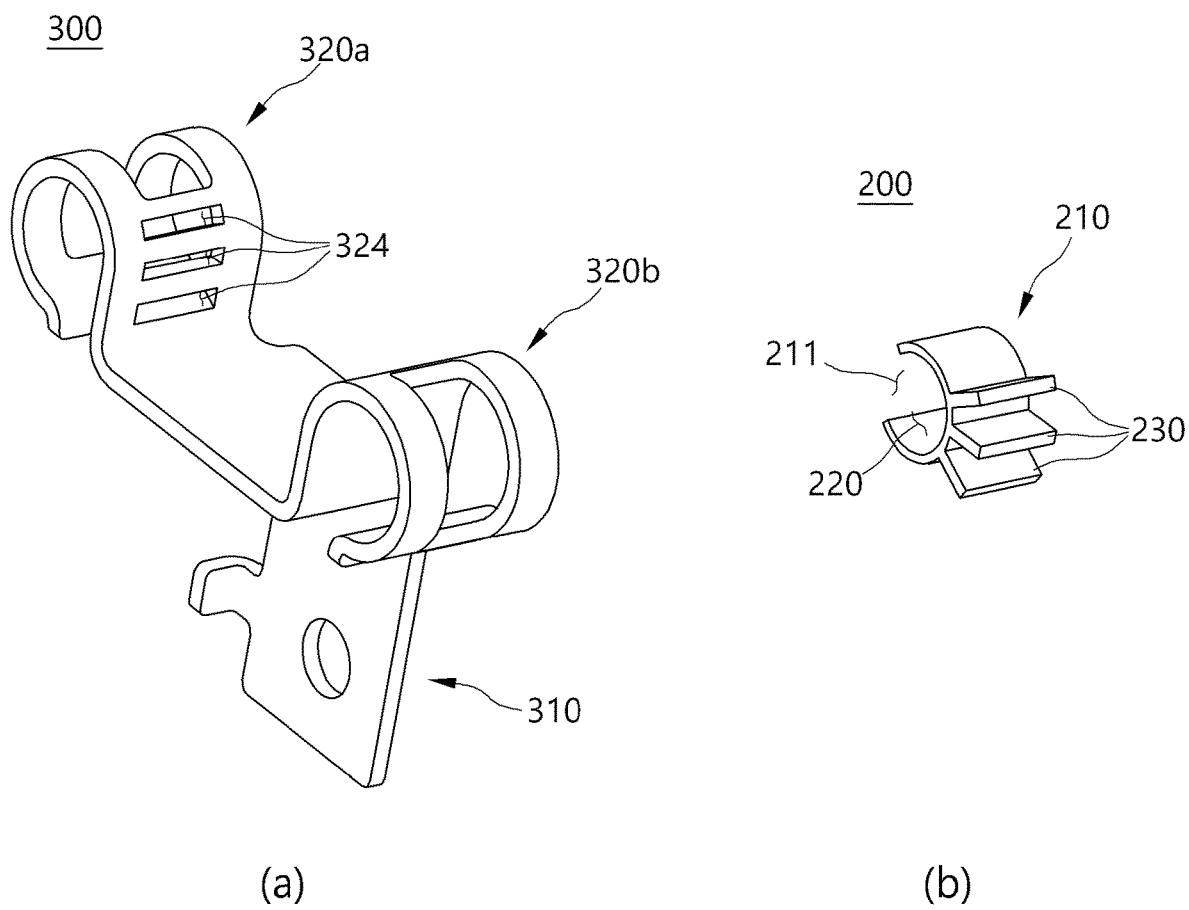
FIG. 10 is a perspective view illustrating another embodiment of the fixer of FIG. 6 and the brackets of FIGS. 8 to 9.

Meanwhile, the bracket 300 may be shape-deformed in various shapes corresponding to the fixer 200. That is, in the embodiment shown in FIG. 10, three fixing grooves 324 are formed in the bracket 300. The three fixing grooves 324 are disposed to be spaced apart from each other along the extension direction of the arm body 321.

In this case, three fixing protrusions 230 are also formed in the fixer 200, and are disposed to be spaced apart from each other along the outer circumference of the fixing body 210. The three fixing protrusions 230 may be inserted into and coupled to the three fixing grooves 324, respectively. In the embodiment, the fixer 200 and the bracket 300 are coupled at a plurality of points so that relative rotation of the main wire M.W, the grommet 100, the fixer 200, and the bracket 300 may be more effectively prevented.

The fixing groove 324 communicates with the coupling space 330.

The coupling space 330 accommodates the main wire M.W or the grommet 100 and the fixer 200 coupled to the main wire M.W. The coupling space 330 communicates with the fixing groove 324. The fixing protrusion 230 of the fixer 200 accommodated in the coupling space 330 may be inserted into or penetrated and coupled into the fixing groove 324.

The coupling space 330 is partially surrounded by the arm body 321. In the illustrated embodiment, the coupling space 330 is surrounded by the arm body 321 in its radial direction, and the lower portion where the pressing protrusion 322 is located is formed open.

The coupling space 330 may have any shape capable of accommodating the main wire M.W, the grommet 100 or the fixer 200. In the illustrated embodiment, the coupling space 330 has a circular cross-section corresponding to the shape of the arm body 321 and is formed in a cylindrical shape having a thickness in a front-rear direction.

The size of the coupling space 330 may be variable. That is, as the arm body 321 is pressed, the coupling space 330 may be expanded or contracted. Accordingly, the main wire M.W, the grommet 100 or the fixer 200 may be easily accommodated in the coupling space 330, and the accommodated state may be stably maintained.

Referring to FIGS. 11 to 16, a process in which a wire coupling structure 10 according to an embodiment of the present invention is coupled to a main wire M.W and a sub wire S.W is shown.

Figure 11:
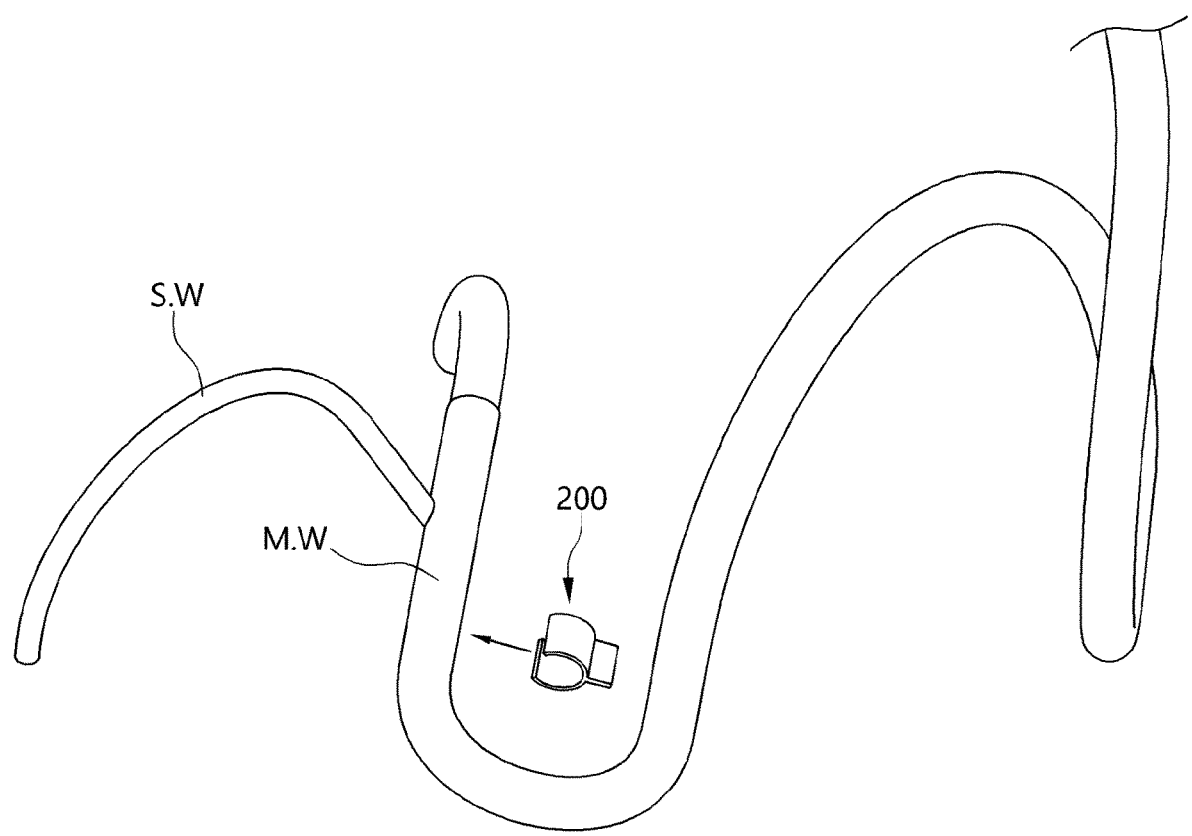
FIGS. 11 to 16 are use state views illustrating a process in which a wire coupling structure according to an embodiment of the present disclosure is coupled to a main wire and a sub wire.

Referring to FIG. 11, first, the fixer 200 is coupled to the main wire M.W. In this case, the main wire M.W is accommodated in the insertion space 220 through the coupling opening 211 formed in the fixer 200. The main wire M.W accommodated in the insertion space 220 is surrounded by the fixing body 210.

Figure 12:
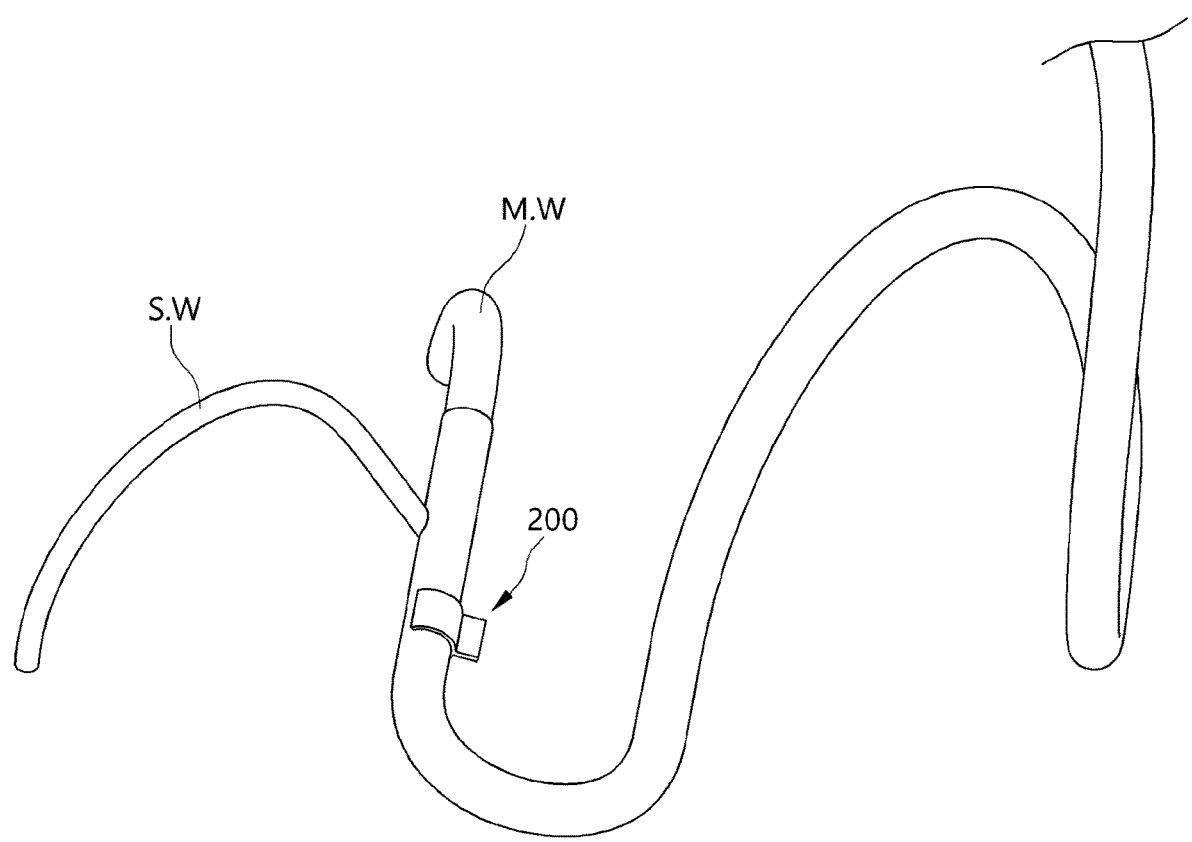

Referring to FIG. 12, the sub wire S.W is branched from the main wire M.W. The sub wire S.W may be branched from the main wire M.W at a portion adjacent to the coupled fixer 200 among the portions of the main wire M.W.

In this case, the processes shown in FIGS. 11 to 12 may be changed in order. That is, after the branching process of the main wire M.W and the sub wire S.W is preceded, the fixer 200 and the main wire M.W may be coupled. In the above embodiment, the fixer 200 may be positioned adjacent to a portion where the main wire M.W and the sub wire S.W are branched.

Figure 13:
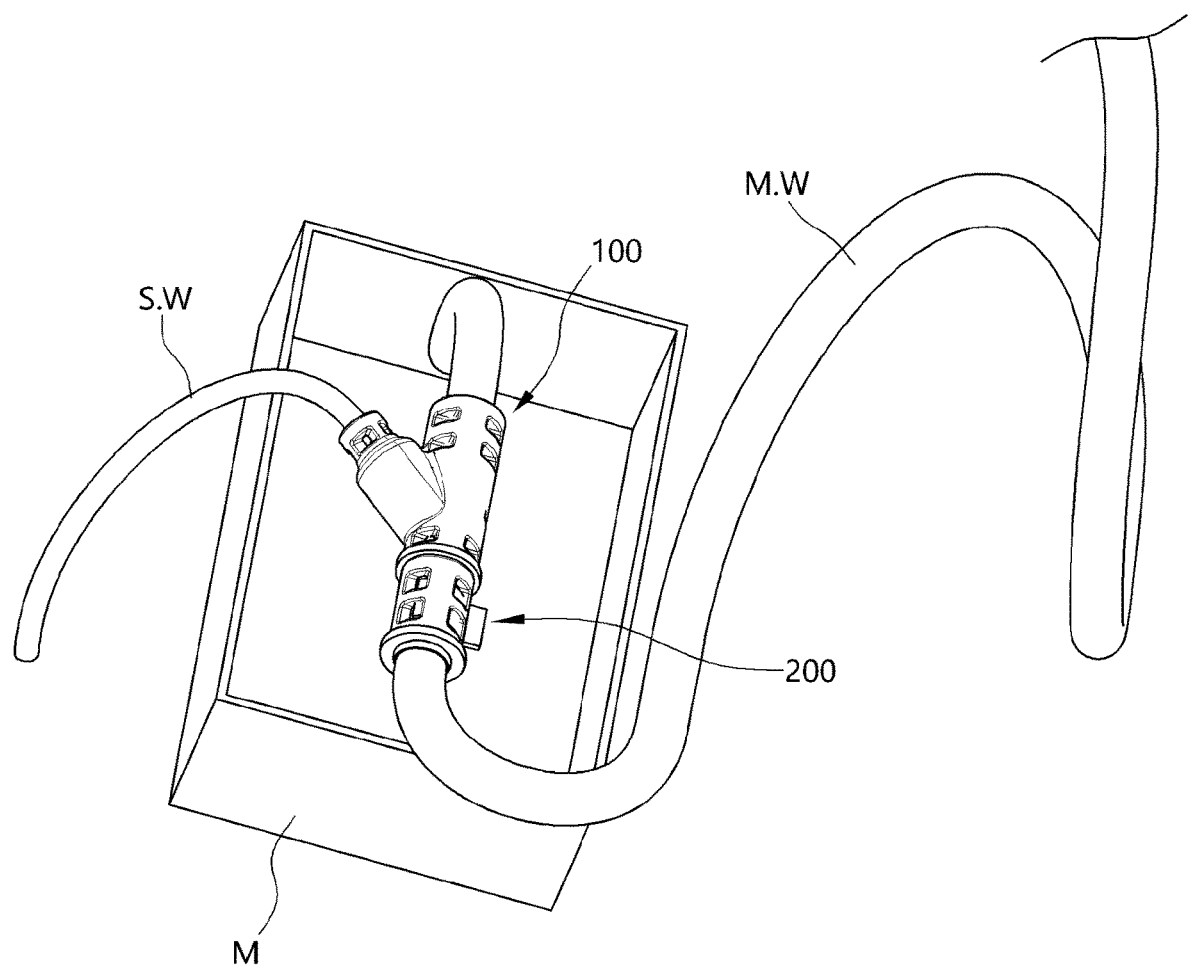

Referring to FIG. 13, a state in which the grommet 100 is formed to surround the fixer 200 coupled to the main wire M.W is shown. Specifically, after the main wire M.W, the sub wire S.W, and the fixer 200 are accommodated in a mold M, the grommet 100 may be injection molded. Accordingly, the grommet 100 may be formed to surround the main wire M.W, the sub wire S.W, and the fixer 200.

In this case, it will be understood that the fixing protrusion 230 of the fixer 200 protrudes outward from the grommet 100.

Figure 14:
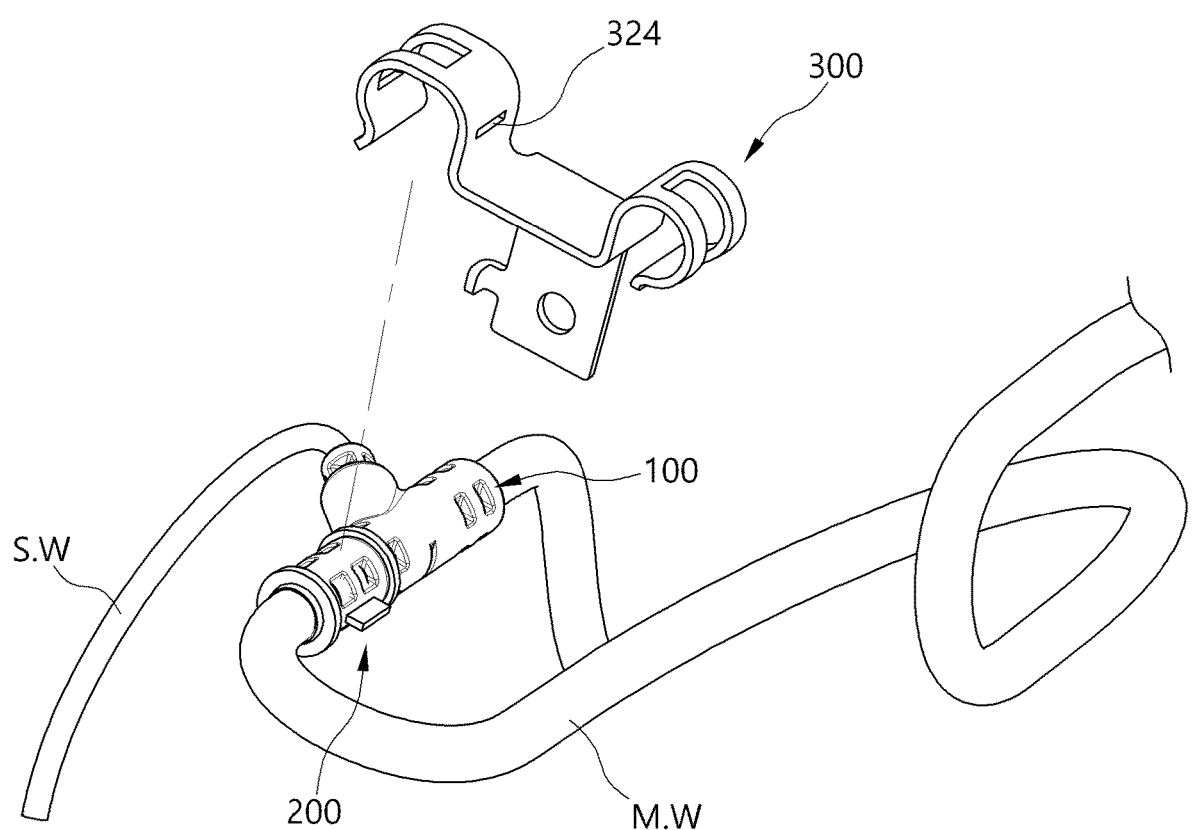

Referring to FIG. 14, a state in which the bracket 300 is coupled to the main wire M.W, the grommet 100, and the fixer 200 is shown. In the illustrated embodiment, the first bracket arm 320a positioned on the left side is coupled to the main wire M.W, the grommet 100, and the fixer 200 positioned on the left side, and the second bracket arm 320b positioned on the right side is coupled to the main wire M.W.

Figure 15:
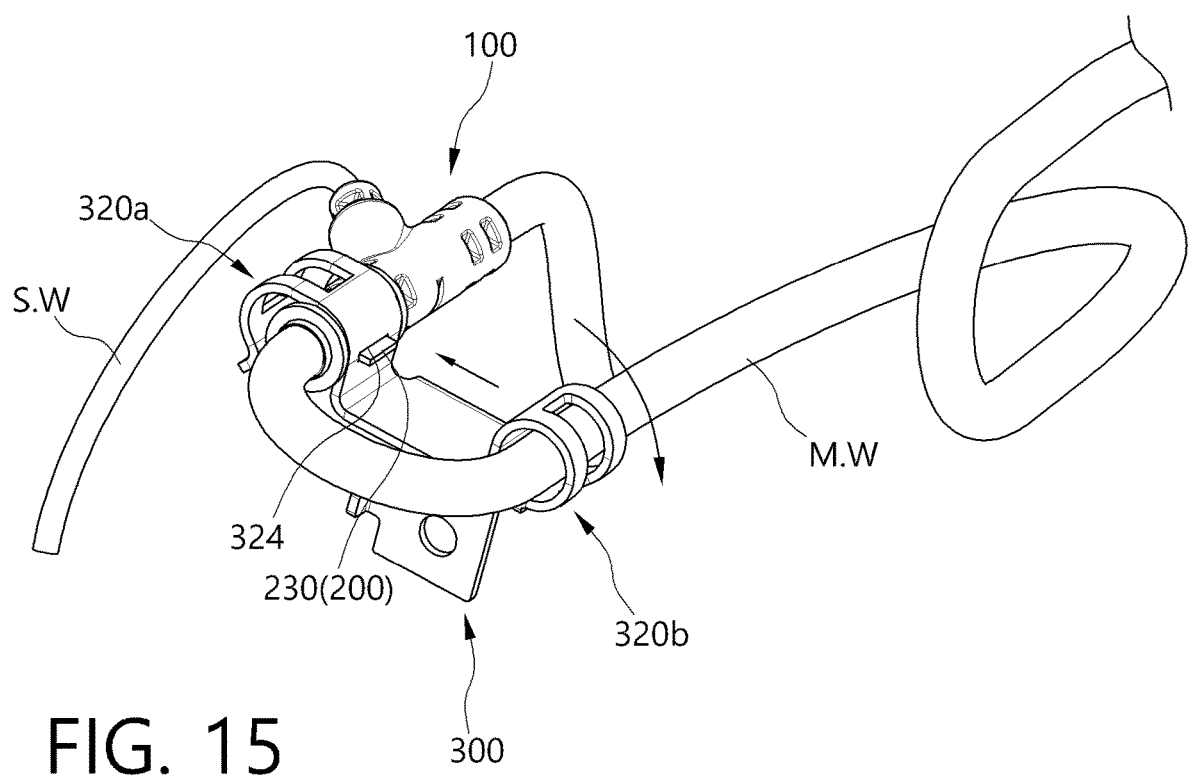

Referring to FIG. 15, a state in which the main wire M.W, the grommet 100, or the fixer 200 is accommodated in the coupling space 330 is shown. The main wire M.W, the grommet 100, and the fixer 200 are accommodated in the coupling space 330 of the first bracket arm 320a, and the main wire M.W is accommodated in the coupling space 330 of the second bracket arm 320b.

In this case, the first bracket arm 320a is moved in a direction toward the main wire M.W, that is, to the left, so that the fixing protrusion 230 is coupled through the fixing groove 324. In addition, the second bracket arm 320a is pressed clockwise after the main wire M.W is accommodated in the coupling space 330, so that the arm body 321 is coupled to the main wire M.W.

Figure 16:
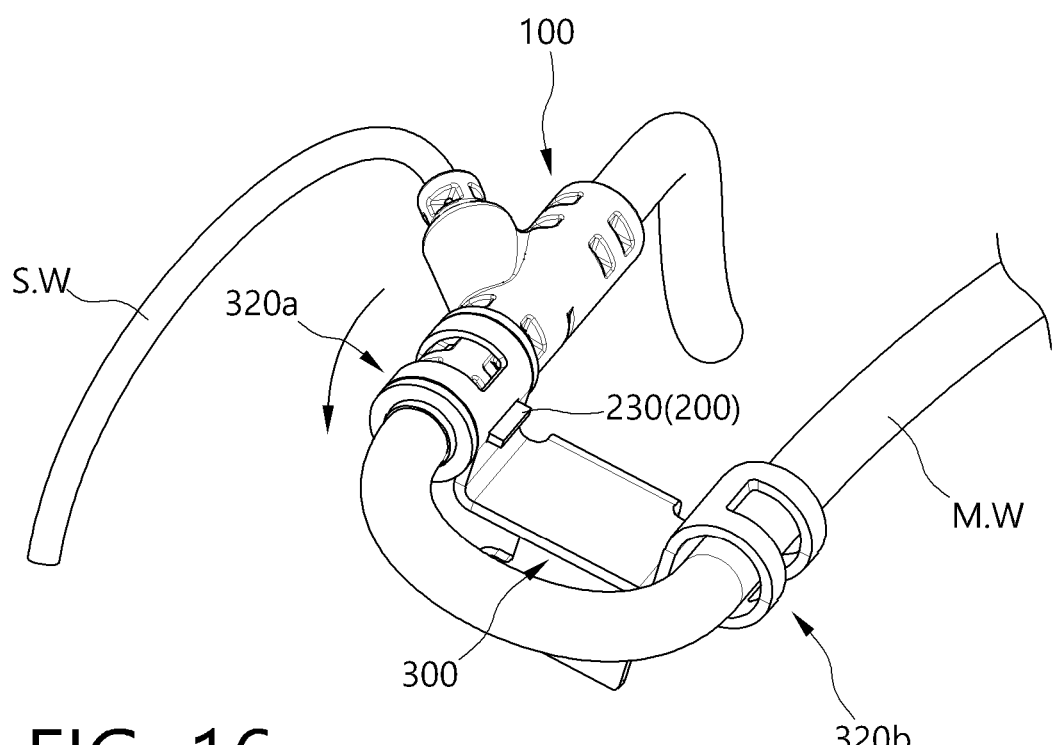

Referring to FIG. 16, after the main wire M.W, the grommet 100, and the fixer 200 are accommodated in the coupling space 330 of the first bracket arm 320a, the first bracket arm 320a is pressed counterclockwise so that the arm body 321 is coupled to the main wire M.W, the grommet 100, and the fixer 200. In the above state, the fixing protrusion 230 is penetrated through the fixing groove 324 and exposed outward.

Accordingly, relative rotation between the main wire M.W, the sub wire S.W, the grommet 100, the fixer 200, and the bracket 300 may be prevented.

Referring to FIGS. 17 to 20, a method of installing a wire coupling structure 10 according to an embodiment of the present invention with a main wire M.W and a sub wire S.W is shown. The method of installing the wire coupling structure 10 according to the illustrated embodiment may be achieved by each configuration of the wire coupling structure 10 described above.

Figure 17:
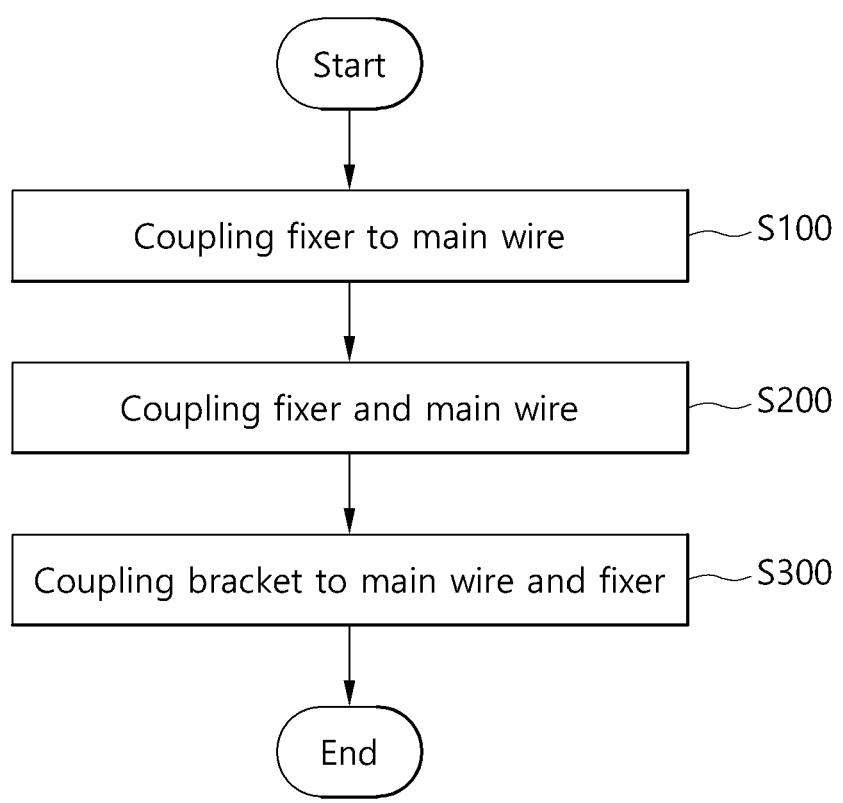
FIG. 17 is a flowchart illustrating a flow of a method of installing a wire coupling structure according to an embodiment of the present disclosure.

In the embodiment shown in FIG. 17, the method of installing of the wire coupling structure 10 includes a step S100 of coupling the fixer 200 to the main wire M.W, a step S200 of coupling the main wire M.W and the fixer 200, and a step S300 of coupling the bracket 300 to the main wire M.W and the fixer 200.

Figure 18:
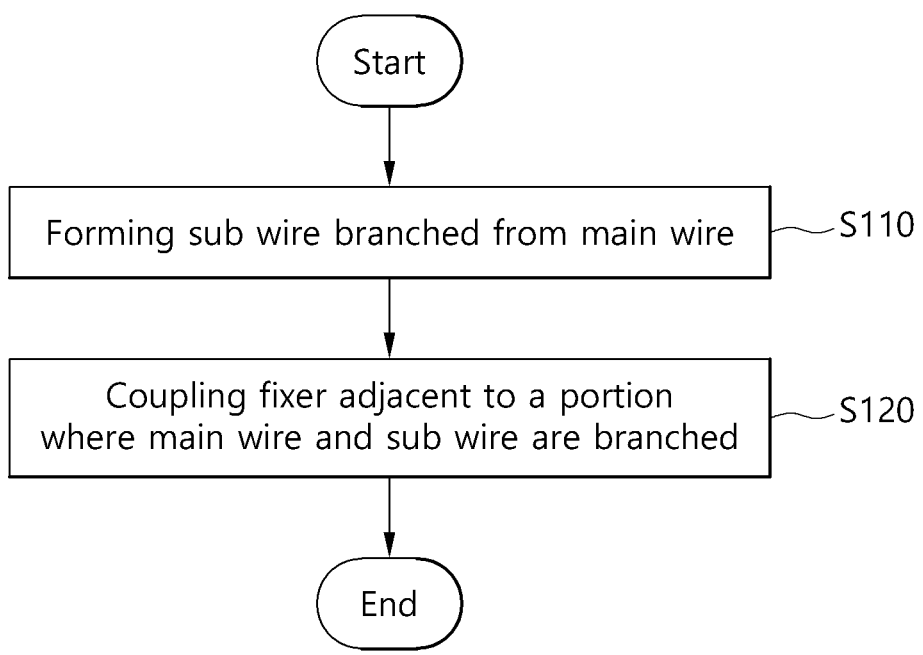
FIG. 18 is a flowchart illustrating a detailed flow of step S100 of the method of installing the wire coupling structure of FIG. 17.

Referring to FIG. 18, a detailed flow of the step S100 in which the fixer 200 is coupled to the main wire M.W is shown. This step (S100) is a step (S100) in which the sub wire S.W is formed to be branched from the main wire M.W, and the fixer 200 is coupled to the main wire M.W.

First, the sub wire S.W is formed to be branched from the main wire M.W and coupled to each other to be electric-current-conducting (S110). The fixer 200 is coupled to the main wire M.W so that the main wire M.W and the sub wire S.W are positioned adjacent to the branched portion (S120). In an embodiment, the fixer 200 may be positioned so as to be adjacent to a portion where the main wire M.W and the sub wire S.W are branched, but only adjacent to the main wire M.W.

The order of performing the steps S110 and S120 may be changed. That is, after the fixer 200 is first coupled to the main wire M.W, the sub wire S.W may be formed to be branched from the main wire M.W.

Figure 19:
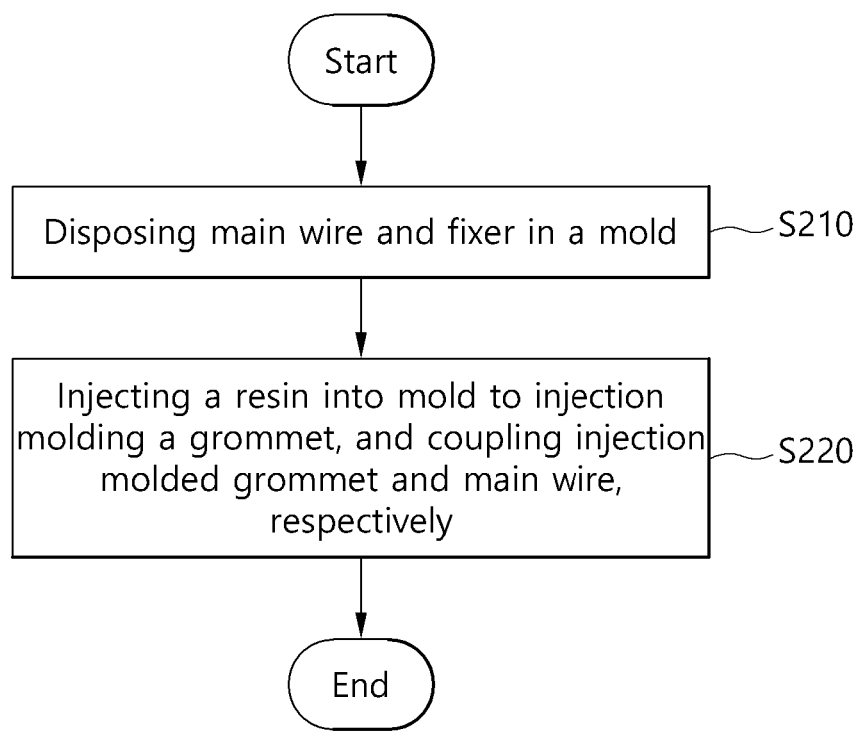
FIG. 19 is a flowchart illustrating a detailed flow of step S200 of the method of installing the wire coupling structure of FIG. 17.

Referring to FIG. 19, a detailed flow of the step S200 in which the main wire M.W and the fixer 200 are coupled is shown. This step (S200) is a step (S200) in which the main wire M.W, the sub wire S.W, and the fixer 200 coupled thereto are coupled to each other while being surrounded by the grommet 100.

First, the main wire M.W and the fixer 200 coupled thereto are disposed in a mold M (S210). In this case, it will be understood that the sub wire S.W branched from the main wire M.W is also disposed in the mold M.

Next, resin is injected into the mold M, and the grommet 100 is injection molded. Accordingly, the grommet 100 surrounds the fixer 200, the main wire M.W coupled to the fixer 200, and the sub wire S.W branched from the main wire M.W, and is coupled to the main wire M.W, the sub wire S.W, and the fixer 200 (S220). As a result, the fixer 200 and the main wire M.W may be coupled.

Figure 20:
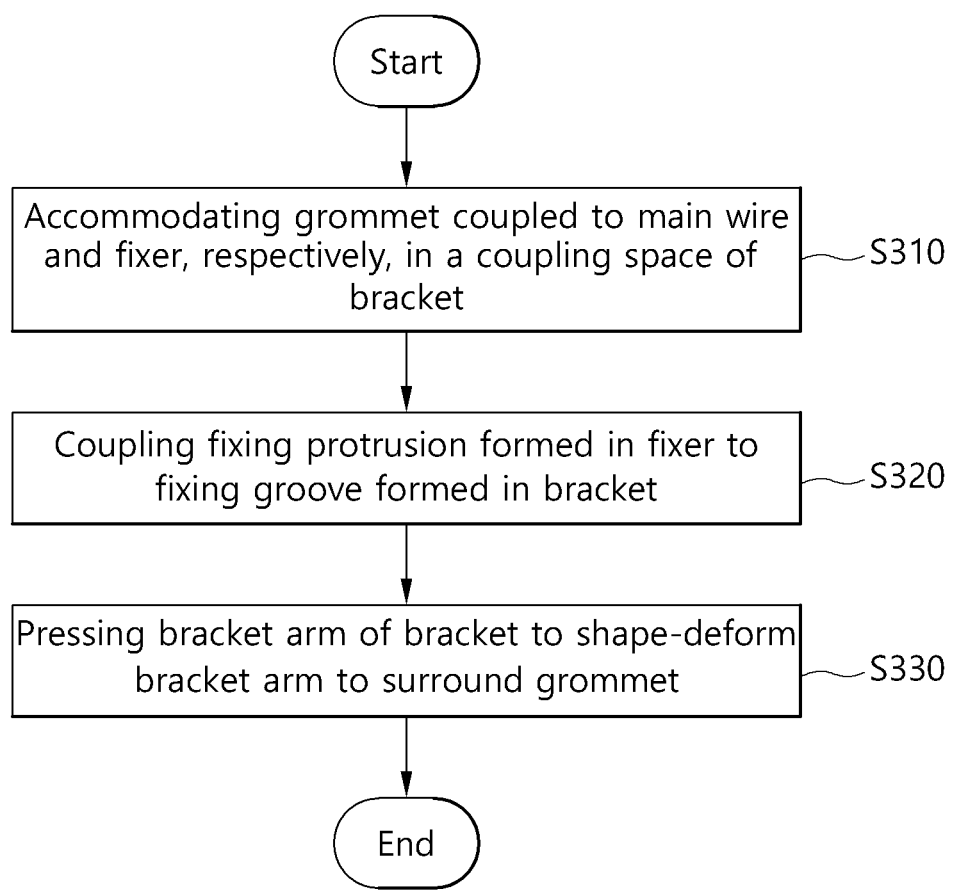
FIG. 20 is a flowchart illustrating a detailed flow of step S300 of the method of installing the wire coupling structure of FIG. 17.

Referring to FIG. 20, a detailed flow of the step S300 in which the bracket 300 is coupled to the main wire M.W and the fixer 200 is shown. This step (S300) is a step (S300) in which the bracket 300 is coupled to the main wire M.W and coupled to the fixer 200 so as to prevent any rotation of each component of the wire coupling structure 10.

First, the grommet 100 respectively coupled to the main wire M.W and the fixer 200 is accommodated in the coupling space 330 of the bracket 300 (S310). That is, the main wire M.W, the grommet 100 and the fixer 200 are accommodated in the coupling space 330, respectively.

In this case, the fixing protrusion 230 formed in the fixer 200 is inserted into or coupled through the fixing groove 324 formed in the bracket 300 (S320). To this end, the shapes of the fixing protrusion 230 and the fixing groove 324 are correspondingly formed as described above.

Next, the bracket arm 320 of the bracket 300 is pressed and formed to surround the grommet 100, the main wire M.W accommodated therein, and the fixer 200 (S330). In this case, the pressing protrusion 322 is pressed along the extension direction of the arm body 321 so that the arm body 321 may contact and support the grommet 100 accommodated in the coupling space 330.

Although exemplary embodiments of the present disclosure have been described, the idea of the present disclosure is not limited to the embodiments set forth herein. Those of ordinary skill in the art who understand the idea of the present disclosure may easily propose other embodiments through supplement, change, removal, addition, etc. of elements within the same idea, but the embodiments will be also within the scope of the present disclosure.

<Description of Symbols>

| | |
|---|---|
| 10: wire coupling structure | 100: grommet |
| 110: main body | 111: main hollow |
| 120: sub body | 121: sub hollow |
| 130: through hole | 200: fixer |
| 210: fixing body | 220: insertion space |
| 230: fixing protrusion | 300: bracket |
| 310: bracket body | 311: first bracket body |
| 312: second bracket body | 313: coupling protrusion |
| 314: coupling hole | 320: bracket arm |
| 320a: first bracket arm | 320b: second bracket arm |
| 321: arm body | 322: pressing protrusion |
| 323: slimming groove | 324: fixing groove |
| 330: coupling space | M.W: main wire |
| S.W: sub wire | M: mold |

What is claimed is:

1. A wire coupling structure, comprising:
   a fixer coupled to an external wire;
   a grommet surrounding the fixer and coupled to the wire and the fixer; and
   a bracket surrounding the grommet and coupled to the grommet,
   wherein the fixer comprises:
      a fixing body surrounding the wire from a radial outside; and
      a fixing protrusion continuous with the fixing body and protruding outward and exposed outward of the grommet, and
   wherein the bracket comprises:
      an arm body surrounding the grommet from a radial outside; and
      a fixing groove formed through an inside of the arm body and coupled to the fixing protrusion.

2. The wire coupling structure of claim 1,
   wherein the fixing body has a width in a first direction, and
   wherein the fixing protrusion has an extension length in the first direction longer than an extension length in a second direction perpendicular to the first direction.

3. The wire coupling structure of claim 2,
wherein the fixing body is rounded to be convex outward and extended to have an arc-shaped cross-section having a center positioned therein, and
wherein the fixing protrusion has an extension length in the first direction longer than an extension length in a direction along an extension direction of the fixing body.

4. The wire coupling structure of claim 2, wherein the fixing protrusion is formed in a polygonal pillar shape, having a length in the first direction, a width in the second direction, and a thickness in a third direction perpendicular to both the first direction and the second direction.

5. The wire coupling structure of claim 1,
wherein the fixing body is formed to be rounded to be convex outward and to have an arc-shaped cross-section having a center positioned therein, and
wherein a plurality of fixing protrusions are provided, and the plurality of fixing protrusions are disposed to be spaced apart from each other along the outer circumference of the fixing body.

6. The wire coupling structure of claim 5,
wherein the arm body is formed to be rounded to be convex outward and to have an arc-shaped cross-section having a center positioned therein, and
wherein a plurality of fixing grooves are formed, and the plurality of fixing grooves are disposed to be spaced apart from each other along the outer circumference of the arm body.

7. The wire coupling structure of claim 6, wherein the plurality of fixing protrusions are coupled to the plurality of fixing grooves, respectively.

8. The wire coupling structure of claim 1, wherein the fixing body comprises:
a coupling opening disposed opposite to the fixing protrusion; and
an insertion space located radially inside the fixing body, communicating with the coupling opening and accommodating the wire.

9. The wire coupling structure of claim 8,
wherein the fixing body is formed of an elastic material, and
wherein the coupling opening is configured to be expanded or contracted by an external force.

10. The wire coupling structure of claim 1,
wherein the wire comprises:
a main wire coupled to the fixer; and
a sub wire branched from the main wire and electric-current-conducted with the main wire, and
wherein the grommet comprises:
a main body surrounding the fixer and the main wire and coupled to the fixer and the main wire and extending along one direction; and
a sub body continuous with the main body and surrounding the sub wire and coupled to the sub wire and extending along another direction forming a predetermined angle with respect to the one direction.

11. The wire coupling structure of claim 10, wherein the grommet comprises:
a main hollow formed through an inside of the main body to accommodate the fixer and the main wire; and
a sub hollow formed through an inside of the sub body to accommodate the sub wire, and communicating with the main hollow.

12. The wire coupling structure of claim 11, wherein the main body and the sub body extend at a predetermined angle.

13. The wire coupling structure of claim 1, wherein the bracket comprises:
a bracket body coupled to an external component;
a bracket arm continuous with the bracket body, and coupled to the wire or the grommet including the arm body and the fixing groove; and
a coupling space partially surrounded by the bracket arm, and accommodating the wire or the grommet.

14. The wire coupling structure of claim 13, wherein the bracket arm comprises:
a first bracket arm continuous with one side of the bracket body, and coupled to one side of the wire; and
a second bracket arm continuous with another side of the bracket body, and coupled to another side of the wire.

15. The wire coupling structure of claim 13,
wherein the arm body is formed to be rounded to be convex outward and to have an arc-shaped cross-section having a center positioned therein, and
wherein the bracket arm comprises a slimming groove formed through an inside of the arm body, and extending along the outer circumference of the arm body.

16. The wire coupling structure of claim 15, wherein the bracket arm comprises a pressing protrusion positioned at an end of the arm body, and configured to be extending at a predetermined angle with the arm body to be pressed by an external force.

17. A method for installing a wire coupling structure, the method comprising:
coupling a fixer to a main wire;
coupling the main wire and the fixer, wherein the step of coupling the main wire and the fixer includes:
disposing the main wire and the fixer in a mold, and injecting a resin into the mold to injection molding a grommet, and coupling the injection molded grommet and the main wire, respectively; and
coupling a bracket to the main wire and the fixer.

18. The method for installing a wire coupling structure of claim 17, wherein the step of coupling the fixer to the main wire comprises:
forming a sub wire branched from the main wire; and
coupling the fixer adjacent to a portion where the main wire and the sub wire are branched.

19. The method for installing a wire coupling structure of claim 17, wherein the step of coupling the bracket to the main wire and the fixer comprises:
accommodating a grommet coupled to the main wire and the fixer, respectively, in a coupling space of the bracket;
coupling a fixing protrusion formed in the fixer to a fixing groove formed in the bracket; and
pressing a bracket arm of the bracket to shape-deform the bracket arm to surround the grommet.

* * * * *